United States Patent
Sawano et al.

(10) Patent No.: US 11,142,267 B2
(45) Date of Patent: Oct. 12, 2021

(54) PASSIVE WALKING APPARATUS AND PASSIVE WALKING MODULE

(71) Applicant: NINTENDO CO., LTD., Kyoto-shi, Kyoto (JP)

(72) Inventors: Takao Sawano, Kyoto (JP); Keizo Ohta, Kyoto (JP); Masashi Shiomi, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 107 days.

(21) Appl. No.: 15/779,667

(22) PCT Filed: May 19, 2017

(86) PCT No.: PCT/JP2017/018885
§ 371 (c)(1),
(2) Date: May 29, 2018

(87) PCT Pub. No.: WO2017/212899
PCT Pub. Date: Dec. 14, 2017

(65) Prior Publication Data
US 2018/0370585 A1    Dec. 27, 2018

(30) Foreign Application Priority Data

Jun. 8, 2016  (JP) .............................. JP2016-114429

(51) Int. Cl.
*B62D 57/00* (2006.01)
*B62D 57/032* (2006.01)
*F16H 21/40* (2006.01)

(52) U.S. Cl.
CPC ........... *B62D 57/032* (2013.01); *F16H 21/40* (2013.01)

(58) Field of Classification Search
CPC  B25J 9/00; B25J 15/00; B62D 57/032; F16H 21/40
See application file for complete search history.

(56) References Cited

U.S. PATENT DOCUMENTS

| | | | | |
|---|---|---|---|---|
| 5,355,064 A | * | 10/1994 | Yoshino | B62D 57/032 180/8.1 |
| 5,455,497 A | * | 10/1995 | Hirose | B62D 57/032 180/8.1 |

(Continued)

FOREIGN PATENT DOCUMENTS

| | | |
|---|---|---|
| CN | 103395457 | 11/2013 |
| CN | 103963869 | 8/2014 |

(Continued)

OTHER PUBLICATIONS

International Search Report for PCT/JP2017/018885 dated Aug. 1, 2017, 4 pages.

(Continued)

*Primary Examiner* — Zakaria Elahmadi
(74) *Attorney, Agent, or Firm* — Nixon & Vanderhye P.C.

(57) ABSTRACT

A passive walking apparatus (100) according to one embodiment includes a hip portion (1), a first leg (21), a second leg (22), and a crank mechanism (3) including a first-leg-side crank portion (31), a second-leg-side crank portion (34), a crankshaft (33), a first-leg-side connection portion (32), and a second-leg-side connection portion (35). When the first leg (21) moves rearward from the front relatively to the hip portion (1) as being in contact with a walking surface (GR), the first-leg-side connection portion (32) has the first-leg-side crank portion (31) pivot, the first-leg-side crank portion (31) has the second-leg-side crank portion (34) pivot around the crankshaft (33), and the second-leg-side crank portion (34) moves the second leg (22) forward from the rear relatively to the hip portion (1) with the second-leg-side connection portion (35) being interposed.

19 Claims, 20 Drawing Sheets

(56) References Cited

U.S. PATENT DOCUMENTS

| | | | | |
|---|---|---|---|---|
| 6,564,888 | B1* | 5/2003 | Gomi | B62D 57/032 |
| | | | | 180/8.6 |
| 6,915,230 | B2* | 7/2005 | Kawai | A61B 5/1038 |
| | | | | 702/127 |
| 2005/0102111 | A1* | 5/2005 | Dariush | B25J 9/0006 |
| | | | | 702/41 |
| 2005/0167167 | A1* | 8/2005 | Miyazaki | B62D 57/032 |
| | | | | 180/8.2 |
| 2008/0203955 | A1* | 8/2008 | Gomi | B62D 57/032 |
| | | | | 318/568.12 |
| 2009/0055021 | A1* | 2/2009 | Sano | B62D 57/032 |
| | | | | 700/254 |
| 2009/0237025 | A1* | 9/2009 | Takenaka | B62D 57/032 |
| | | | | 318/568.12 |
| 2009/0260472 | A1* | 10/2009 | Suga | B62D 57/032 |
| | | | | 74/490.05 |
| 2011/0199038 | A1* | 8/2011 | Godler | B25J 9/126 |
| | | | | 318/568.12 |
| 2011/0297461 | A1* | 12/2011 | Miyazaki | B25J 9/106 |
| | | | | 180/8.6 |
| 2016/0243699 | A1* | 8/2016 | Kim | B25J 9/1605 |
| 2016/0347387 | A1* | 12/2016 | Hurst | B62D 57/02 |
| 2017/0097084 | A1* | 4/2017 | Eaton | B60K 17/043 |
| 2018/0290511 | A1* | 10/2018 | Gordon | B60G 17/00 |
| 2019/0168400 | A1* | 6/2019 | Kamon | F16H 21/02 |
| 2019/0240832 | A1* | 8/2019 | Kawaguchi | F16H 21/46 |
| 2020/0180145 | A1* | 6/2020 | Xiong | B25J 9/106 |
| 2020/0290209 | A1* | 9/2020 | Yoshikawa | B62D 57/032 |

FOREIGN PATENT DOCUMENTS

| | | |
|---|---|---|
| CN | 104890756 A | 9/2015 |
| JP | 58-132475 | 8/1983 |
| JP | 60-259580 A | 12/1985 |
| JP | 61-205567 A | 9/1986 |
| JP | 63-32590 | 3/1988 |
| JP | 2001-129268 | 5/2001 |
| JP | 2002-219673 | 8/2002 |
| JP | 2002219673 A * | 8/2002 |
| JP | 2005-144582 | 6/2005 |
| JP | 2005-246565 A | 9/2005 |
| JP | 2009-274142 | 11/2009 |
| JP | 2011-131677 | 7/2011 |

OTHER PUBLICATIONS

Tanaka, E., et al., "The Development of Walking Assist Mechanism Supporting Whole Legs", Proceedings of the 23$^{rd}$ Annual Conference of the Robotics Society of Japan, Robotics Society of Japan, Sep. 15, 2005 with English language abstract (4 pages).

* cited by examiner

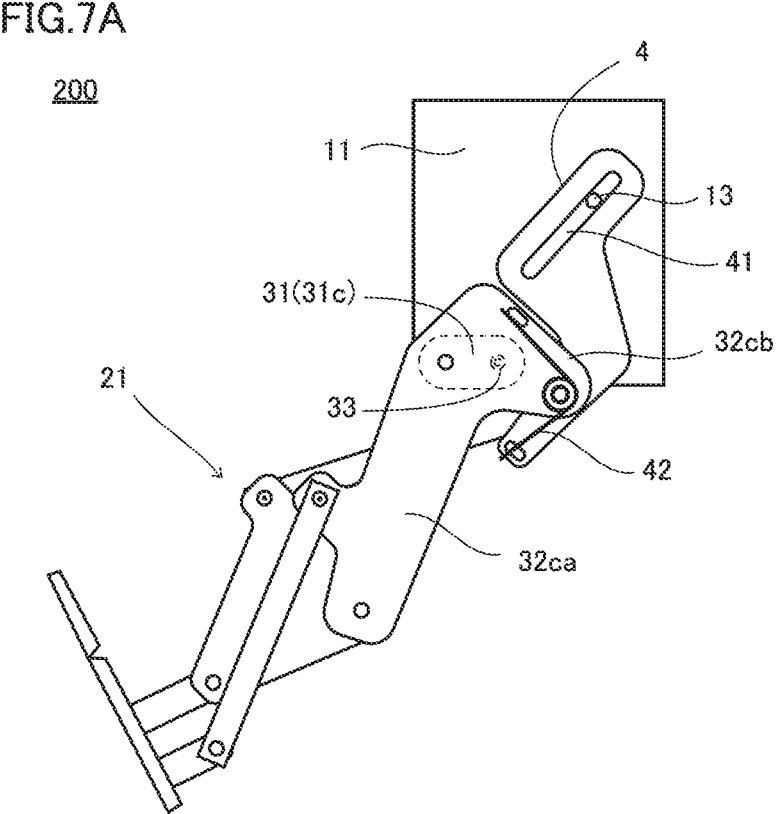

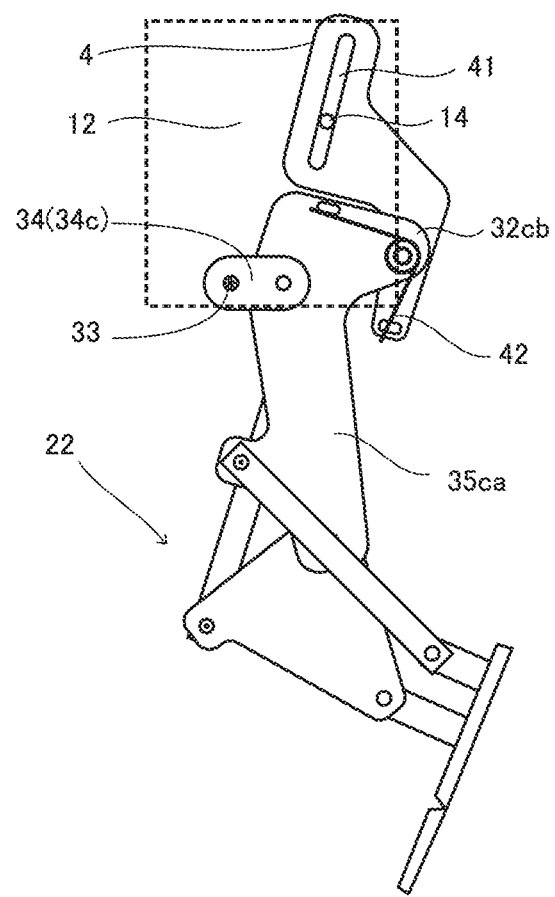

PASSIVE WALKING APPARATUS AND PASSIVE WALKING MODULE

This application is the U.S. national phase of International Application No. PCT/JP2017/018885 filed May 19, 2017 which designated the U.S. and claims priority to JP Patent Application No. 2016-114429 filed Jun. 8, 2016, the entire contents of each of which are hereby incorporated by reference.

TECHNICAL FIELD

The present invention relates to a passive walking apparatus and a passive walking module.

BACKGROUND ART

A passive walking apparatus described in Japanese Patent Laying-Open No. 2011-131677 (PTD 1) represents a conventional passive walking apparatus. The passive walking apparatus described in PTD 1 includes two legs and a hip joint portion including a hip shaft. These two legs are attached to the hip joint portion by being pivotably coupled to the hip shaft.

CITATION LIST

Patent Document

PTD 1: Japanese Patent Laying-Open No. 2011-131677

SUMMARY OF INVENTION

Technical Problem

The passive walking apparatus described in PTD 1 does not include a mechanism for having two legs operate in coordination. Therefore, it is difficult for the passive walking apparatus described in PTD 1 to continue walking in a stable manner.

The present invention was made in view of such a problem of the conventional art. The present invention more specifically provides a passive walking apparatus capable of continuing passive walking in a stable manner.

Solution to Problem

A passive walking apparatus according to one manner of the present invention includes a hip portion including a first side portion and a second side portion located opposite to the first side portion, a first leg coupled to the first side portion, a second leg coupled to the second side portion, and a crank mechanism including a first-leg-side crank portion provided on a side of the first side portion, a second-leg-side crank portion provided on a side of the second side portion as being opposite in phase to the first-leg-side crank portion, a crankshaft coupling the first-leg-side crank portion and the second-leg-side crank portion to each other, a first-leg-side connection portion connected to the first leg and the first-leg-side crank portion, and a second-leg-side connection portion connected to the second-leg-side crank portion and the second leg.

When the first leg moves rearward from the front relatively to the hip portion as being in contact with a walking surface, the first-leg-side connection portion has the first-leg-side crank portion pivot and the first-leg-side crank portion has the second-leg-side crank portion pivot around the crankshaft. The second-leg-side crank portion moves the second leg forward from the rear relatively to the hip portion with the second-leg-side connection portion being interposed.

Advantageous Effects of Invention

According to the above, the passive walking apparatus can continue stable passive walking.

BRIEF DESCRIPTION OF DRAWINGS

FIG. 7A is a side view of a passive walking apparatus according to a second embodiment showing a construction on a side of a first leg.

FIG. 7B is a side view of the passive walking apparatus according to the second embodiment showing only a construction on a side of a second leg.

DESCRIPTION OF EMBODIMENTS

Figure 1:
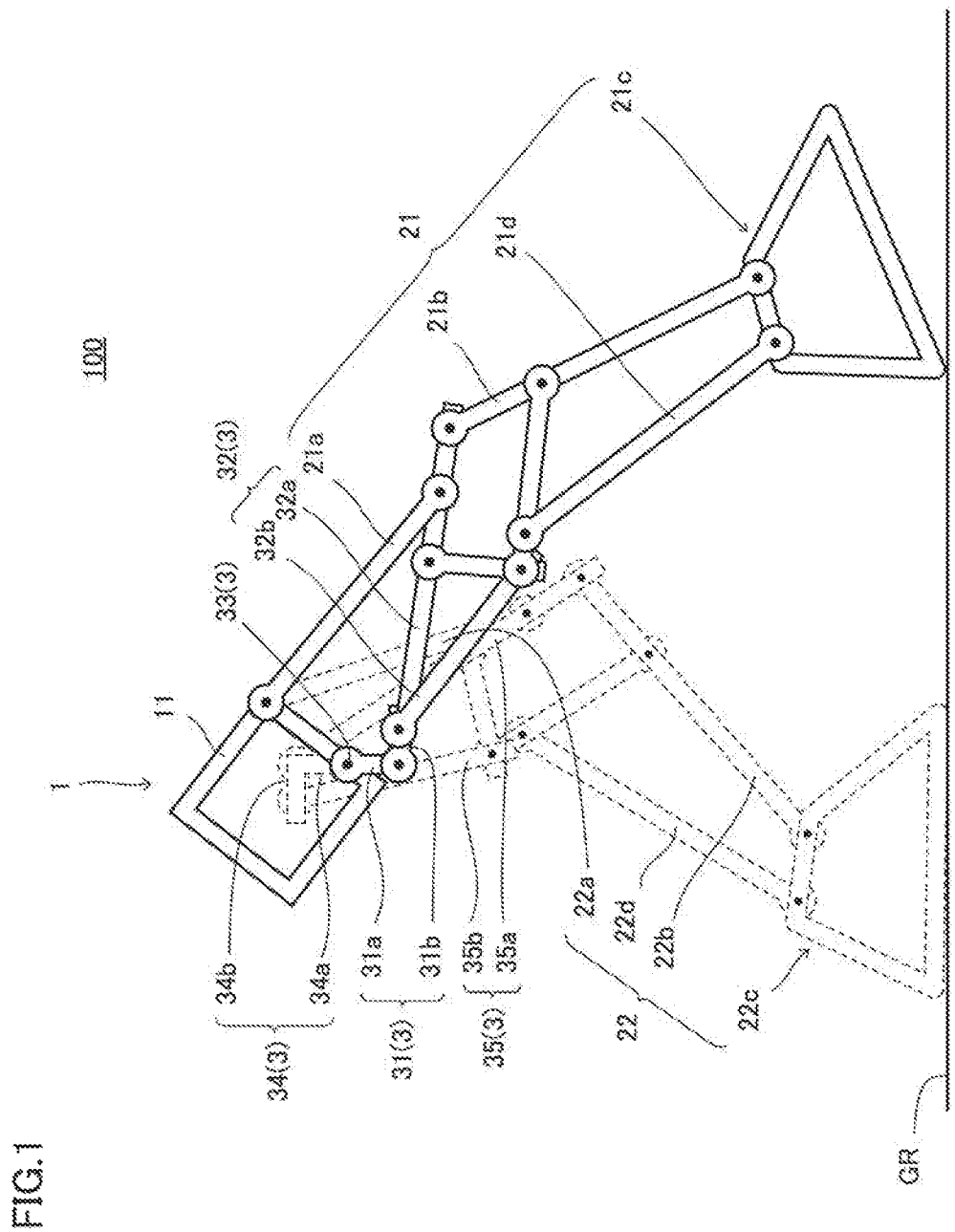
FIG. 1 is a side view of a passive walking apparatus according to a first embodiment.

An embodiment will be described below with reference to the drawings. The same or corresponding elements in the drawings have the same reference characters allotted. At least a part of the embodiment described below may arbitrarily be combined.

First Embodiment

A construction of a passive walking apparatus 100 according to a first embodiment will be described below. FIG. 1 is a side view of passive walking apparatus 100 according to the first embodiment. As shown in FIG. 1, passive walking apparatus 100 according to the first embodiment includes a hip portion 1. Hip portion 1 includes a first side portion 11 and a second side portion 12 (not shown). Second side portion 12 is a side portion of hip portion 1 located opposite to first side portion 11.

Passive walking apparatus 100 according to the first embodiment includes a leg portion 2. The number of legs included in leg portion 2 is set, for example, to two. The number of legs included in leg portion 2, however, is not limited as such. The number of legs included in leg portion 2 may be set to three or more. An example in which the number of legs included in leg portion 2 is set to two, that is, passive walking apparatus 100 according to the first embodiment includes a first leg 21 and a second leg 22, will be described below for the sake of convenience.

As shown in FIG. 1, first leg 21 is coupled to first side portion 11. First leg 21 is pivotable with respect to first side portion 11. More specifically, first leg 21 is movable forward and rearward around a point of coupling to hip portion 1. Forward herein means a direction of movement of passive walking apparatus 100 according to the first embodiment and rearward means a direction opposite to the direction of movement of passive walking apparatus 100 according to the first embodiment.

First leg 21 includes a thigh portion 21a, a lower leg portion 21b, and a foot portion 21c. Foot portion 21c is a portion in contact with a walking surface GR. Lower leg portion 21b is coupled to foot portion 21c. Thigh portion 21a is coupled to lower leg portion 21b with a first connection member 32a which will be described later being interposed.

First leg 21 may further include a calf portion 21d. Calf portion 21d has one end coupled to foot portion 21c.

Second leg 22 is similar in construction to first leg 21. Second leg 22 is coupled to second side portion 12 as being movable forward and rearward around a point of coupling to hip portion 1 and includes a thigh portion 22a, a lower leg portion 22b, and a foot portion 22c.

Passive walking apparatus 100 according to the first embodiment includes a crank mechanism 3. Crank mechanism 3 includes a crank portion 31, a connection portion 32, a crankshaft 33, a crank portion 34, and a connection portion 35.

Crank portion 31 is provided in first side portion 11 of hip portion 1. Connection portion 32 is connected to crank portion 31 and first leg 21. Crank portion 34 is provided in second side portion 12 of hip portion 1. Connection portion 35 is connected to crank portion 34 and second leg 22. Crankshaft 33 is coupled to crank portion 31 and crank portion 34. Crank portion 34 is provided as being opposite in phase to crank portion 31. Crank portion 34 is provided as being in point symmetry to crank portion 31 with respect to crankshaft 33.

Connection portion 32 has crank portion 31 pivot when first leg 21 moves rearward from the front relatively to hip portion 1 as being in contact with walking surface GR when first leg 21 functions as a support leg (a leg on a side in contact with walking surface GR). Crank portion 31 transmits this pivot to crank portion 34 with crankshaft 33 being interposed. With this pivot, crank portion 34 moves second leg 22 functioning as an idling leg (a leg on a side not in contact with walking surface GR) forward from the rear relatively to hip portion 1 with connection portion 35 being interposed.

This is also applicable to a case in which second leg 22 functions as the support leg. More specifically, connection portion 35 has crank portion 34 pivot when second leg 22 moves rearward from the front relatively to hip portion 1. Crank portion 34 transmits this pivot to crank portion 31 with crankshaft 33 being interposed. With this pivot, crank portion 31 moves first leg 21 functioning as the idling leg forward from the rear relatively to hip portion 1 with connection portion 32 being interposed.

Details of crank mechanism 3 according to the first embodiment will be described below. Crank portion 31 includes a first crank 31a and a second crank 31b. Connection portion 32 includes a first connection member 32a and a second connection member 32b.

First connection member 32a has one end coupled to first crank 31a. First connection member 32a is coupled also to first leg 21. First connection member 32a is preferably coupled to thigh portion 21a. First connection member 32a is preferably coupled to first crank 31a and first leg 21 such that a straight line connecting a position of contact of first leg 21 with walking surface GR at a time point of the contact of first leg 21 with the walking surface to a point of connection of first crank 31a to first connection member 32a substantially matches with a tangent line of pivot of first crank 31a (a tangent line of a circular path of pivot of first crank 31a).

A case that the straight line connecting the position of contact of first leg 21 with walking surface GR at the time point of the contact of first leg 21 with the walking surface to the point of connection of first crank 31a to first connection member 32a substantially matches with the tangent line of pivot of first crank 31a includes not only a case that the straight line connecting the position of contact of first leg 21 with walking surface GR at the time point of the contact of first leg 21 with the walking surface to the point of connection of first crank 31a to first connection member 32a matches with the tangent line of pivot of first crank 31a but also a case that an angle formed between the straight line connecting the position of contact of first leg 21 with walking surface GR at the time point of the contact of first leg 21 with the walking surface to the point of connection of first crank 31a to first connection member 32a and the tangent line of pivot of first crank 31a is within a range of ±10°.

Second connection member 32b has one end coupled to second crank 31b. Second connection member 32b is coupled also to first leg 21. Second connection member 32b is preferably coupled to lower leg portion 21b. Second connection member 32b may be coupled to the other end of calf portion 21d. Second connection member 32b may be constituted of a plurality of members. Second connection member 32b is preferably coupled to second crank 31b such that a straight line connecting a position of contact of first leg 21 at a time point of passage of first leg 21 under hip portion 1 to a point of connection of second crank 31b to second connection member 32b substantially matches with a tangent line of pivot of second crank 31b.

A case that the straight line connecting the position of contact of first leg 21 at the time point of passage of first leg 21 under hip portion 1 to the point of connection of second crank 31b to second connection member 32b substantially matches with the tangent line of pivot of second crank 31b includes not only a case that the straight line connecting the position of contact of first leg 21 at the time point of passage of first leg 21 under hip portion 1 to the point of connection of second crank 31b to second connection member 32b matches with the tangent line of pivot of second crank 31b but also a case that an angle formed between the straight line connecting the position of contact of first leg 21 at the time point of passage of first leg 21 under hip portion 1 to the point of connection of second crank 31b to second connection member 32b and the tangent line of pivot of second crank 31b is within a range of ±10°.

A direction of extension of an arm of first crank 31a and a direction of extension of an arm of second crank 31b form a prescribed angle. From a different point of view, first crank 31a and second crank 31b are arranged such that their positions of dead points are not superimposed on each other. An angle formed between the direction of extension of the arm of first crank 31a and the direction of extension of the arm of second crank 31b is set, for example, to 90°.

Crank portion 34 is similar in construction to crank portion 31. Crank portion 34 includes a first crank 34a and a second crank 34b, and first crank 34a and second crank 34b are arranged such that their positions of dead points are not superimposed on each other. First crank 34a is opposite in phase to first crank 31a and second crank 34b is opposite in phase to second crank 31b.

Connection portion 35 is also similar in construction to connection portion 32. Connection portion 35 includes a first connection member 35a and a second connection member 35b. First connection member 35a has one end coupled to first crank 34a. First connection member 35a is coupled also to second leg 22. First connection member 35a is preferably coupled to thigh portion 22a.

Second connection member 35b has one end coupled to second crank 34b. Second connection member 35b is coupled also to second leg 22. Second connection member 35b is preferably coupled to lower leg portion 22b. Second connection member 35b may be coupled to the other end of calf portion 22d.

Figure 2:
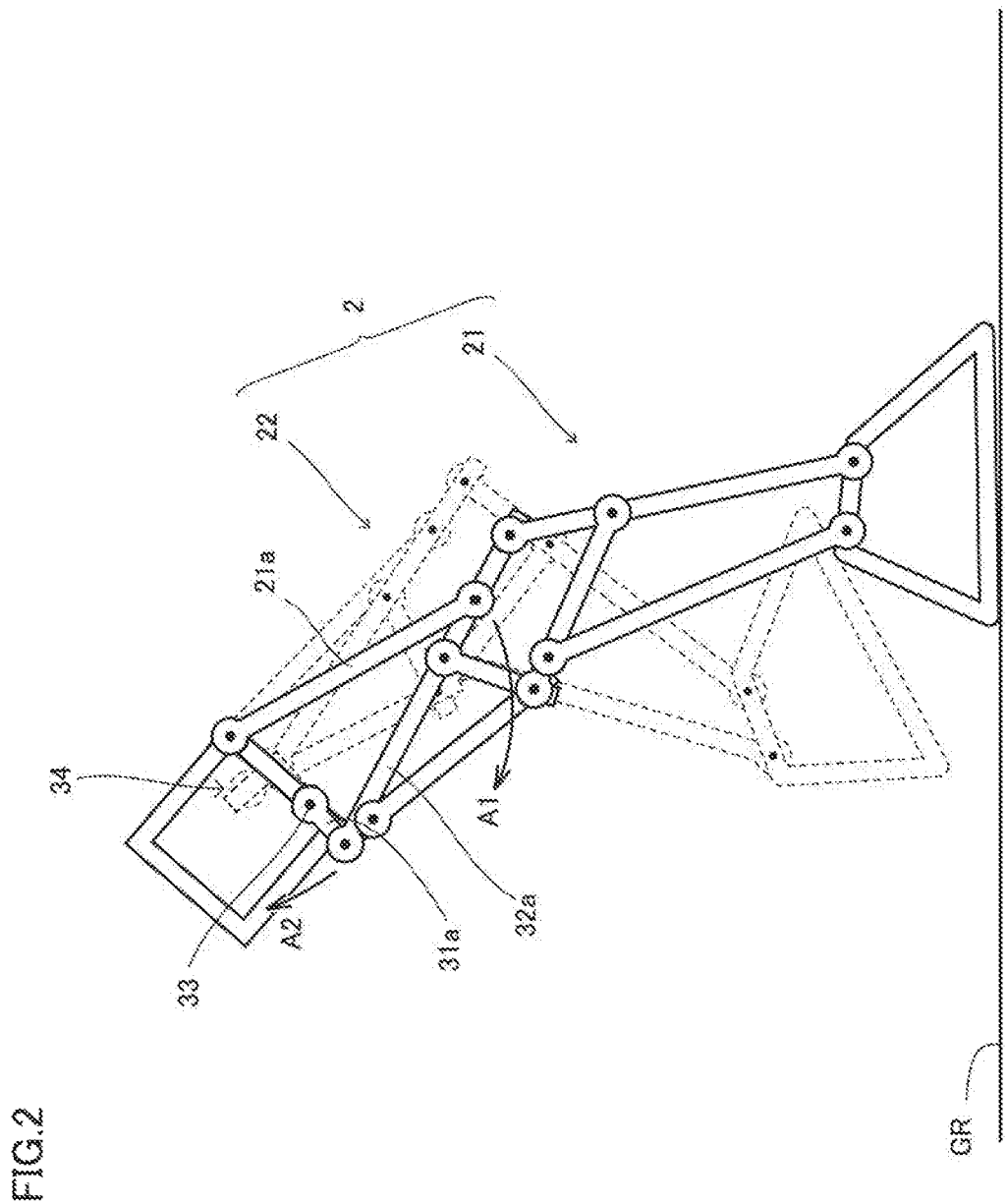
FIG. 2 is a side view of the passive walking apparatus according to the first embodiment at a time point of contact of a support leg with a walking surface.

FIG. 2 is a side view of passive walking apparatus 100 according to the first embodiment at a time point of contact of the support leg with walking surface GR. As shown in FIG. 2, first leg 21 functioning as the support leg comes in contact with walking surface GR and thereafter moves rearward from the front relatively to hip portion 1 with a point of coupling between first leg 21 and hip portion 1 being defined as an axis.

More specifically, thigh portion 21a moves rearward from the front relatively to hip portion 1 with the point of coupling between first leg 21 and hip portion 1 being defined as the axis (see an arrow A1 in the figure). This movement of thigh portion 21a is transmitted to first connection member 32a so that first connection member 32a has first crank 31a pivot (see an arrow A2 in the figure). Consequently, this pivot is transmitted also to crank portion 34 with crankshaft 33 being interposed, and connection portion 35 moves second leg 22 functioning as the idling leg forward from the rear relatively to hip portion 1.

At the time point of contact of the support leg (first leg 21) with walking surface GR, an angle formed between the direction of extension of first connection member 32a and the direction of extension of the arm of first crank 31a is large, however, this angle becomes smaller as first leg 21 moves rearward.

Figure 3:
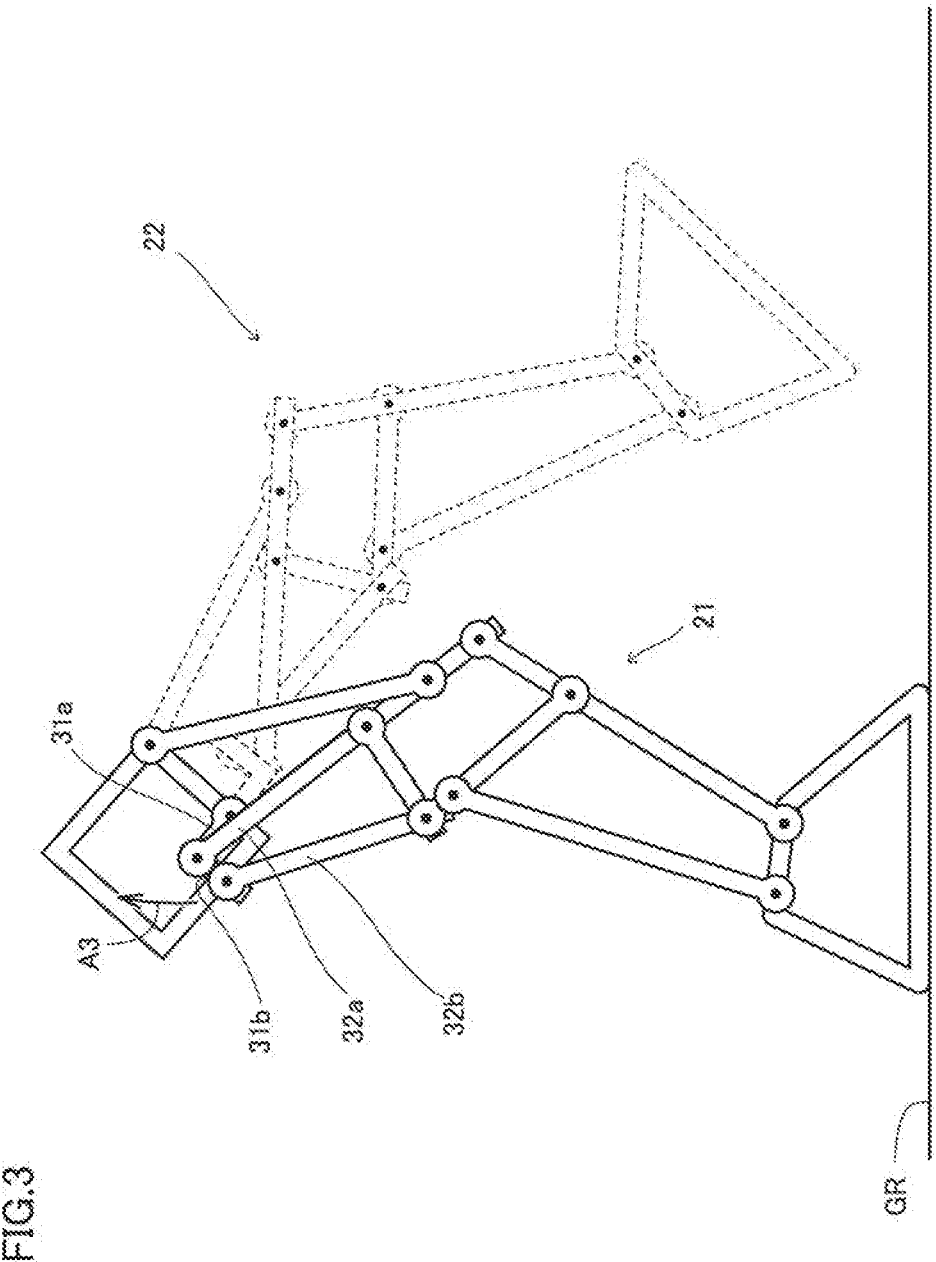
FIG. 3 is a side view of the passive walking apparatus according to the first embodiment at a time point of passage of the support leg in the vicinity of a portion directly under a hip portion.

FIG. 3 is a side view of passive walking apparatus 100 according to the first embodiment at a time point of passage of the support leg in the vicinity of a portion directly under hip portion 1. As shown in FIG. 3, at the time point of passage of the support leg (first leg 21) under hip portion 1, an angle formed between the direction of extension of first connection member 32a and the direction of extension of the arm of first crank 31a has become small (that is, first crank 31a is close to the dead point). Therefore, it is difficult for first connection member 32a to have first crank 31a pivot in this state.

Even at this time point, however, an angle formed between the direction of extension of second connection member 32b and the direction of extension of the arm of second crank 31b has not become small. Therefore, second connection member 32b is able to have second crank 31b pivot (see an arrow A3 in the figure).

Figure 4:
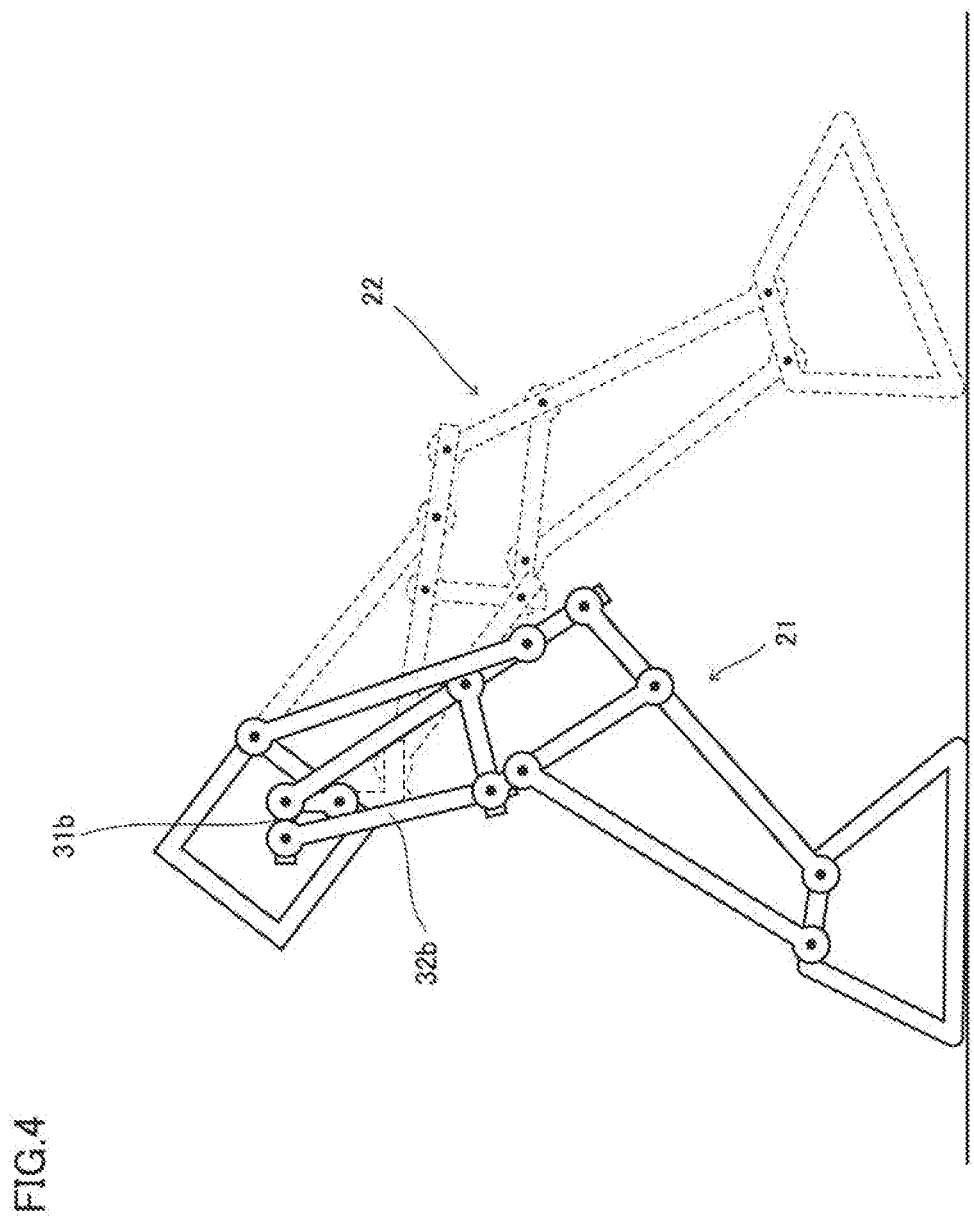
FIG. 4 is a side view of the passive walking apparatus according to the first embodiment at a time point of contact of an idling leg with the walking surface.

FIG. 4 is a side view of passive walking apparatus 100 according to the first embodiment at a time point of contact of the idling leg with walking surface GR. As shown in FIG. 4, when the support leg (first leg 21) moves further rearward when viewed from hip portion 1, an angle formed between the direction of extension of second connection member 32b and the direction of extension of the arm of second crank 31b also becomes smaller. Therefore, it becomes difficult for second connection member 32b to have second crank 31b pivot.

At this time point, however, the idling leg (second leg 22) starts to come in contact with walking surface GR. Therefore, second leg 22 newly functions as the support leg and a cycle the same as above is repeated. Pivot of crank portion 31 and crank portion 34 continues. Thus, in passive walking apparatus 100 according to the first embodiment, throughout a period during which the support leg moves rearward from the front relatively to hip portion 1, at least any one of first crank 31a (first crank 34a) and second crank 31b (second crank 34b) pivots so that passive walking continues.

From a different point of view, first connection member 35a coupled to second leg 22 functioning as the idling leg starts to have first crank 34a pivot before second connection member 32a is unable to have second crank 31b pivot so that passive walking continues.

An effect of passive walking apparatus 100 according to the first embodiment will be described below. As set forth above, in passive walking apparatus 100 according to the first embodiment, movement of the support leg (for example, first leg 21) rearward from the front relatively to hip portion 1 is converted to movement of the idling leg (for example, second leg 22) forward from the rear relatively to hip portion 1, with the connection portion (for example, connection member 32) on the side of the support leg, the crank portion (for example, crank portion 31) on the side of the support leg, crankshaft 33, the crank portion (for example, crank portion 34) on the side of the idling leg (for example, second leg 22), and the connection portion (for example, connection portion 35) on the side of the idling leg being interposed. Therefore, passive walking apparatus 100 according to the first embodiment can continue stable passive walking.

In passive walking apparatus 100 according to the first embodiment, when the crank portion (for example, crank portion 31) on the side of the support leg includes the first crank (for example, first crank 31a) and the second crank different in position of the dead point from the first crank (for example, second crank 31b) and the connection portion (for example, connection portion 32) on the side of the support leg has at least any one of the first crank and the second crank pivot throughout a period during which the support leg moves rearward from the front relatively to hip portion 1, more stable passive walking can continue.

In passive walking apparatus 100 according to the first embodiment, when the support leg (for example, first leg 21) includes the thigh portion (for example, thigh portion 21a) and the lower leg portion (for example, lower leg portion 21b), the connection portion (for example, connection portion 32) includes the first connection member (for example, first connection member 32a) and the second connection member (for example, second connection member 32b), the first connection member is connected to the thigh portion, and the second connection member is connected to the lower leg portion, force received by the support leg from walking surface GR can more efficiently be converted to pivot of the first crank and the second crank. Therefore, in this case, more stable passive walking can continue.

Then, when the straight line connecting the point of contact between the support leg and the walking surface to the point of connection of the first crank (for example, first crank 31a) to the first connection member (for example, first connection member 32a) substantially matches with the tangent line of pivot of the first crank (for example, first crank 31a) at the time point of start of contact of the support leg (for example, first leg 21) with walking surface GR and the straight line connecting the point of contact between the support leg and walking surface GR to the point of connection of the second crank (for example, second crank 31b) to the second connection member (for example, second connection member 32b) substantially matches with the tangent line of pivot of the second crank at the time point of passage of the support leg under hip portion 1, force received by the support leg from walking surface GR can further efficiently be converted to pivot of the first crank and the second crank. Therefore, in this case, further stable passive walking can continue.

Modification of First Embodiment

A construction of a passive walking apparatus 110 according to a modification of the first embodiment will be described below. A difference from the first embodiment will mainly be described and redundant description will not be repeated.

Figure 5:
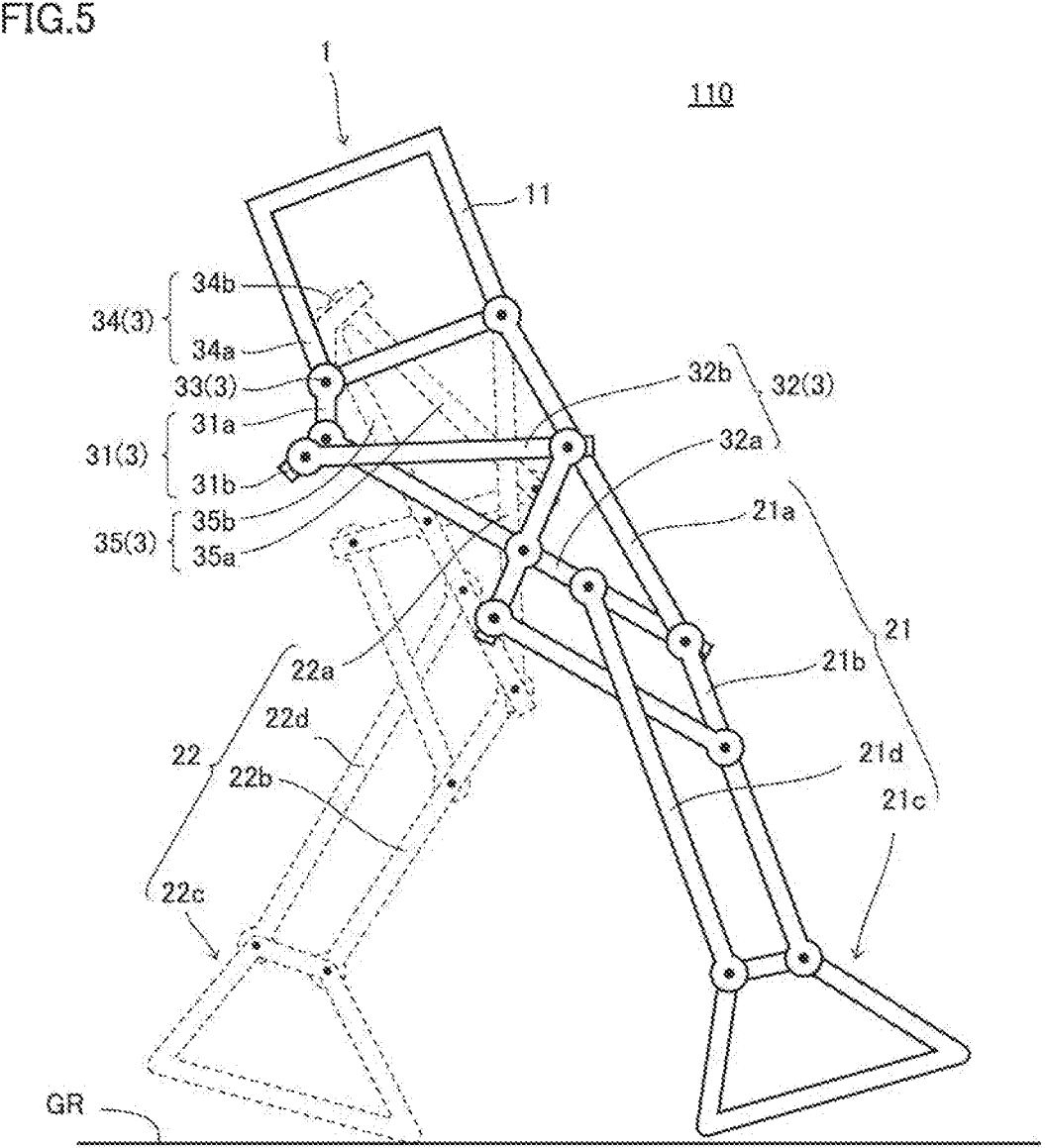
FIG. 5 is a side view of a passive walking apparatus according to a first modification of the first embodiment.

FIG. 5 is a side view of passive walking apparatus 110 according to the first modification of the first embodiment. As shown in FIG. 5, passive walking apparatus 110 according to the first modification of the first embodiment includes hip portion 1, leg portion 2, and crank mechanism 3 similarly to passive walking apparatus 100 according to the first embodiment.

Passive walking apparatus 110 according to the first modification of the first embodiment is different from passive walking apparatus 100 according to the first embodiment in construction of leg portion 2 and crank mechanism 3. More specifically, in passive walking apparatus 110 according to the first modification of the first embodiment, thigh portion 21a (thigh portion 22a) is directly coupled to lower leg portion 21b (lower leg portion 22b). First connection member 32a (first connection member 35a) is coupled to a portion of coupling between thigh portion 21a (thigh portion 22a) and lower leg portion 21b (lower leg portion 22b).

In passive walking apparatus 110 according to the first modification of the first embodiment, an angle formed between the direction of extension of the arm of first crank 31a (first crank 34a) and the direction of extension of the arm of second crank 31b (second crank 34b) is smaller than 90°, and second connection member 32b (second connection member 35b) is connected to second crank 31b (second crank 34b) and thigh portion 21a (thigh portion 22a).

In passive walking apparatus 110 according to the first modification of the first embodiment, calf portion 21d (calf portion 22d) is coupled to first connection member 32a (first connection member 35a).

Figure 6:
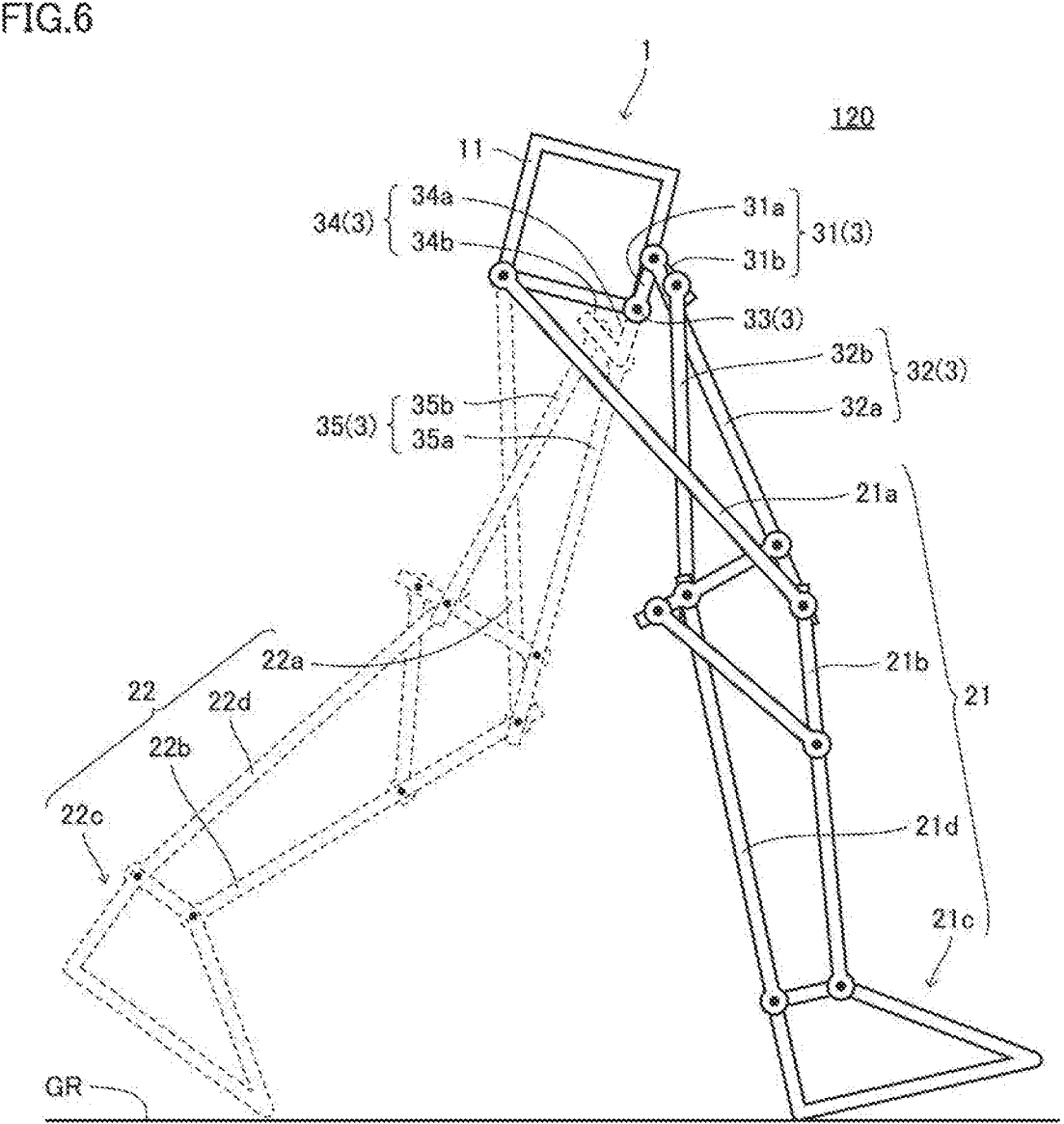
FIG. 6 is a side view of a passive walking apparatus according to a second modification of the first embodiment.

FIG. 6 is a side view of a passive walking apparatus 120 according to a second modification of the first embodiment. As shown in FIG. 6, passive walking apparatus 120 according to the second modification of the first embodiment includes hip portion 1, leg portion 2, and crank mechanism 3 similarly to passive walking apparatus 100 according to the first embodiment and passive walking apparatus 110 according to the first modification of the first embodiment.

Passive walking apparatus 120 according to the second modification of the first embodiment is different from passive walking apparatus 100 according to the first embodiment and passive walking apparatus 110 according to the first modification of the first embodiment in position where leg portion 2 and crank mechanism 3 are provided. More specifically, in passive walking apparatus 120 according to the second modification of the first embodiment, first leg 21 (second leg 22) is arranged in the rear of crank portion 31 (crank portion 34).

By thus adjusting a portion of coupling of each member and an angle formed by each member, passive walking can more smoothly continue.

Second Embodiment

A construction of a passive walking apparatus 200 according to a second embodiment will be described below. A difference from the first embodiment will mainly be described and redundant description will not be repeated.

FIG. 7A is a side view of passive walking apparatus 200 according to the second embodiment which shows a construction on the side of first leg 21. FIG. 7B is a side view of passive walking apparatus 200 according to the second embodiment showing only a construction on the side of second leg 22. As shown in FIGS. 7A and 7B, passive walking apparatus 200 according to the second embodiment includes hip portion 1 including first side portion 11 and second side portion 12, leg portion 2 including first leg 21 coupled to first side portion 11 and second leg 22 coupled to second side portion 12, and crank mechanism 3.

A protruding portion 13 is provided in first side portion 11 and a protruding portion 14 is provided in second side portion 12. Protruding portion 13 and protruding portion 14 are preferably provided in the rear of and above a position where crank mechanism 3 is provided.

Crank mechanism 3 of passive walking apparatus 200 according to the second embodiment includes crank portion 31 provided on the side of first side portion 11, connection portion 32 connecting crank portion 31 and first leg 21 to each other, crankshaft 33 coupling crank portion 31 and crank portion 34 to each other, crank portion 34, and connection portion 35 connecting crank portion 34 and second leg 22 to each other.

Crank portion 31 is implemented by crank 31c, Connection portion 32 is implemented by a connection member 32c. Connection member 32c connects crank 31c and first leg 21 to each other. Connection member 32c includes a first portion 32ca which is a portion extending toward first leg 21 and a second portion 32cb which is a portion extending in a direction different from first portion 32ca.

Crank portion 34 is implemented by crank 34c. Connection portion 35 is implemented by a connection member 35c. Connection member 35c connects crank 34c and second leg 22 to each other. Connection member 35c includes a first portion 35ca which is a portion extending toward second leg 22 and a second portion 35cb which is a portion extending in a direction toward a pivot assistance portion 4.

Passive walking apparatus 200 according to the second embodiment further includes pivot assistance portion 4. Pivot assistance portion 4 is provided on each of the side of first side portion 11 and the side of second side portion 12. Two pivot assistance portions 4 are coupled to second portion 32cb of connection portion 32c and second portion 35cb of connection member 35c, respectively. Pivot assistance portions 4 are thus coupled to crank 31c and crank 34c, respectively.

Pivot assistance portion 4 is provided with a groove 41. Pivot assistance portions 4 are coupled to first side portion 11 and second side portion 12 by inserting protruding portion 13 and protruding portion 14 into grooves 41, respectively. Owing to sliding of protruding portion 13 and protruding portion 14 with respect to grooves 41, positions of pivot assistance portions 4 are variable and pivot assistance portions 4 are pivotable around protruding portion 13 and protruding portion 14, respectively.

Pivot assistance portion 4 includes an elastic member 42. Elastic member 42 is implemented, for example, by a coil spring. Elastic members 42 are provided in respective portions where pivot assistance portions 4 are coupled to connection member 32c and connection member 35c. Elastic members 42 have one ends attached to pivot assistance portions 4 and the other ends attached to connection member 32c and connection member 35c, respectively. Thus, elastic members 42 contract with movement of connection member 32c and connection member 35c in transition of leg portion 2 on the side as the support leg to the idling leg and extend with movement of connection member 32c and connection member 35c in movement of leg portion 2 on the side as the idling leg forward from the rear relatively to hip portion 1.

Figure 8:
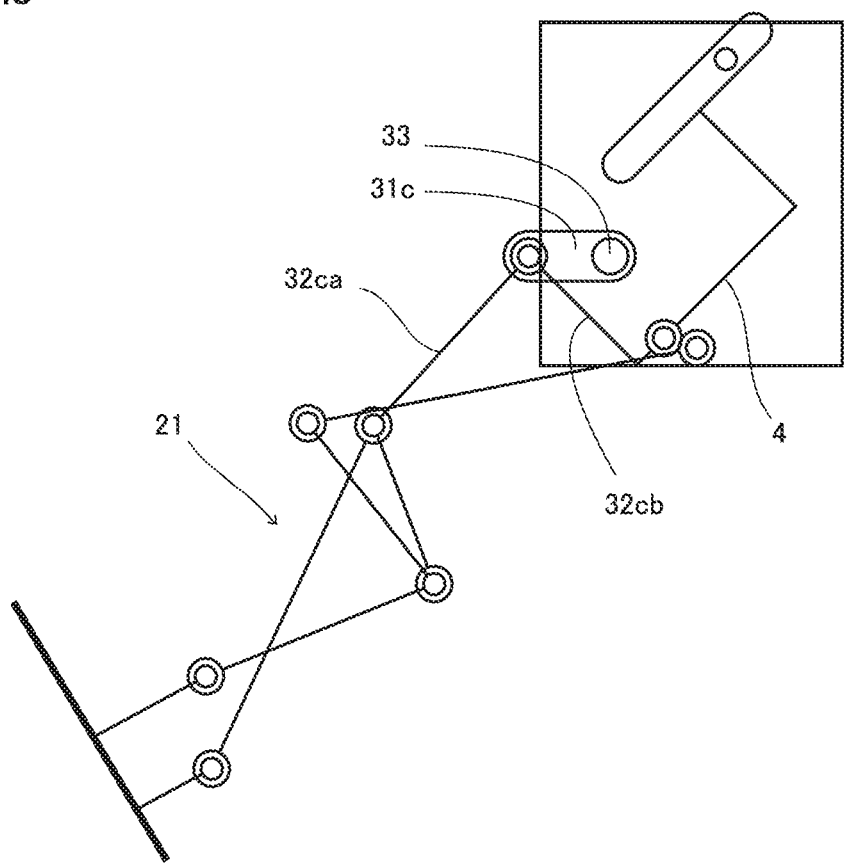
FIG. 8 is a schematic diagram for illustrating an operation on the side of the first leg of the passive walking apparatus according to the second embodiment at a time point immediately before contact of the first leg with the walking surface.
Figure 9:
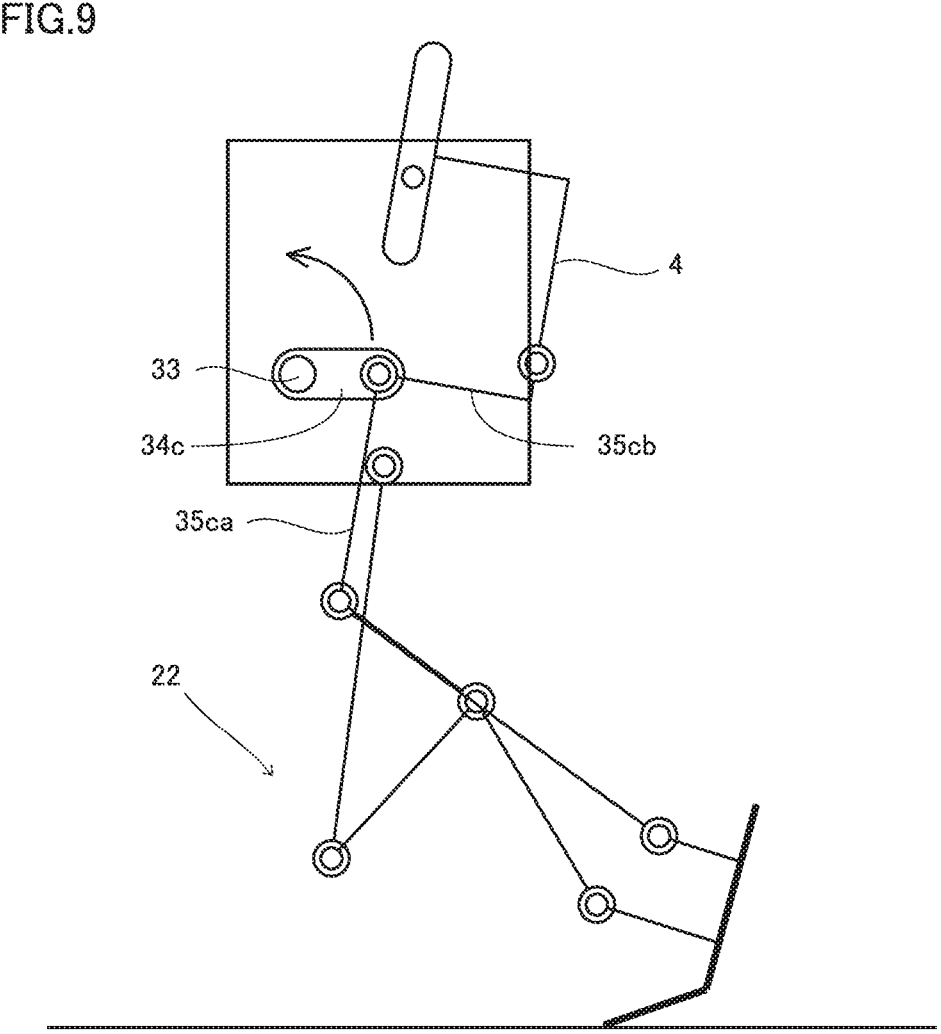
FIG. 9 is a schematic diagram for illustrating an operation on the side of the second leg of the passive walking apparatus according to the second embodiment at the time point immediately before contact of the first leg with the walking surface.
Figure 10:
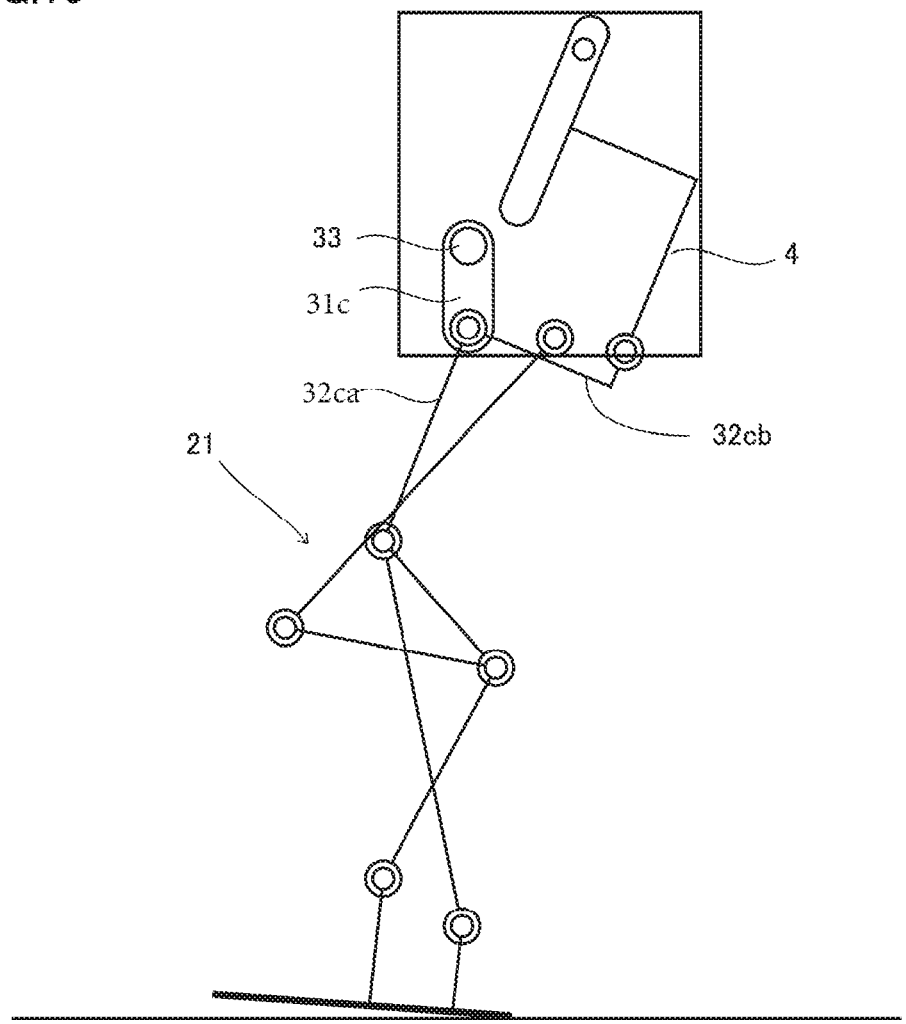
FIG. 10 is a schematic diagram for illustrating an operation on the side of the first leg of the passive walking apparatus according to the second embodiment at a time point immediately after contact of the first leg with the walking surface.
Figure 11:
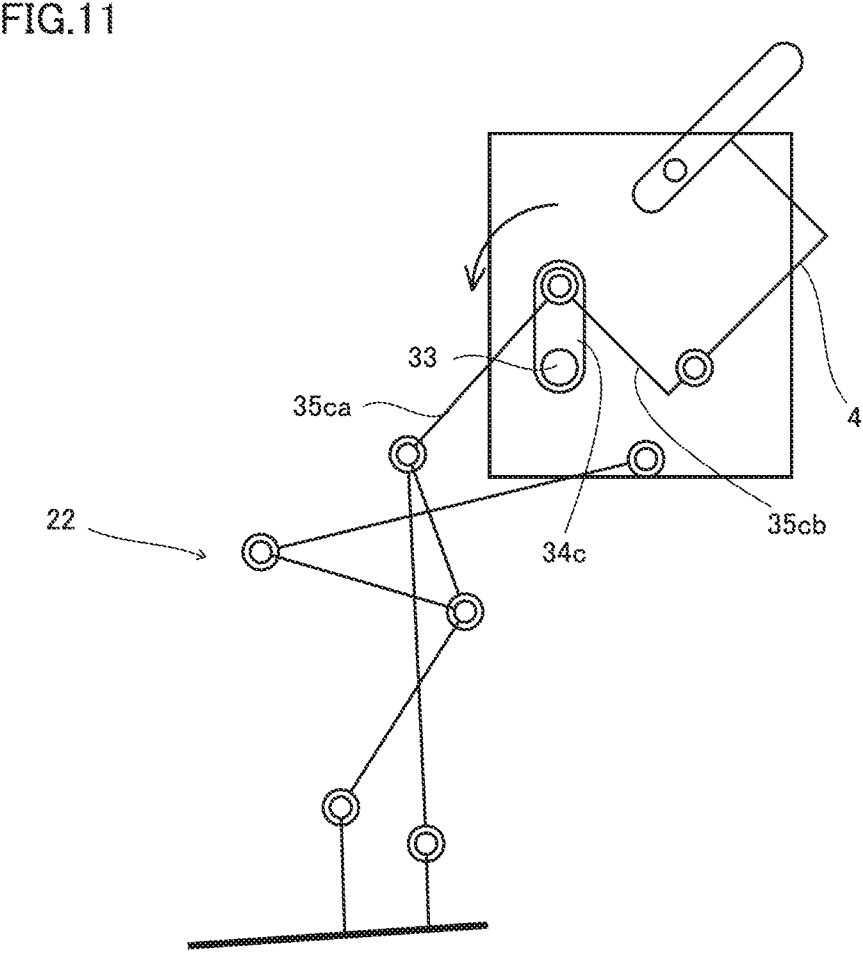
FIG. 11 is a schematic diagram for illustrating an operation on the side of the second leg of the passive walking apparatus according to the second embodiment at the time point immediately after contact of the first leg with the walking surface.

FIG. 8 is a schematic diagram for illustrating an operation on the side of first leg 21 of passive walking apparatus 200 according to the second embodiment at a time point immediately before contact of first leg 21 with the walking surface. FIG. 9 is a schematic diagram for illustrating an operation on the side of second leg 22 of passive walking apparatus 200 according to the second embodiment at the time point immediately before contact of first leg 21 with the walking surface. FIG. 10 is a schematic diagram for illustrating an operation on the side of first leg 21 of passive walking apparatus 200 according to the second embodiment at a time point immediately after contact of first leg 21 with the walking surface. FIG. 11 is a schematic diagram for illustrating an operation on the side of second leg 22 of passive walking apparatus 200 according to the second embodiment at a time point immediately after contact of second leg 22 with the walking surface.

As shown in FIG. 8, at the time point immediately before contact of first leg 21 with the walking surface, first leg 21 functions as the idling leg and second leg 22 functions as the support leg in contact with the walking surface. At this time point, an angle formed between the direction of extension of first portion 35ca of connection member 35c and the direction of extension of the arm of crank 34c is sufficiently large. Therefore, connection member 35c can have crank 34c pivot with reaction force from the ground transmitted from second leg 22. As shown in FIG. 9, pivot of crank 34c is transmitted to crank 31c with crankshaft 33 being interposed and connection member 32c moves first leg 21 rearward from the front relatively to hip portion 1.

As shown in FIG. 10, at the time point immediately after contact of first leg 21 with the walking surface, an angle between the direction of extension of first portion 32ca of connection member 32c and the direction of extension of the arm of crank 31c is small. Therefore, it is difficult to have crank 31c and crank 34c pivot with reaction force from the ground transmitted from first leg 21.

As set forth above, however, elastic member 42 on the side of second leg 22 has contracted when second leg 22 has made transition from the support leg to the idling leg (when second leg 22 has moved away from the walking surface). Therefore, elastic member 42 biases by extending, connection member 35c to move forward from the rear relatively to hip portion 1. Thus, as shown in FIG. 11, pivot assistance portion 4 assists pivot of crank 34c. Consequently, the state of first leg 21 makes transition to the state as in FIG. 8, the state of second leg 22 makes transition to the state as in FIG. 9, and similar operations are repeated to continue passive walking.

An effect of passive walking apparatus 200 according to the second embodiment will be described below. As set forth above, in passive walking apparatus 200 according to the second embodiment, elastic member 42 of pivot assistance portion 4 biases connection member 35c, for example, by contracting when second leg 22 moves away from the walking surface and extending when second leg 22 moves forward from the rear relatively to hip portion 1. Consequently, pivot of crank 31c and crank 34c can be assisted.

Therefore, even when it is difficult to have crank 31c and crank 34c pivot only with ground reaction force obtained from the walking surface through first leg 21 and second leg 22 as well as connection member 32c and connection member 35c, passive walking can continue. Therefore, more stable passive walking can continue without a plurality of cranks as in passive walking apparatus 100 according to the first embodiment.

Third Embodiment

Figure 12:
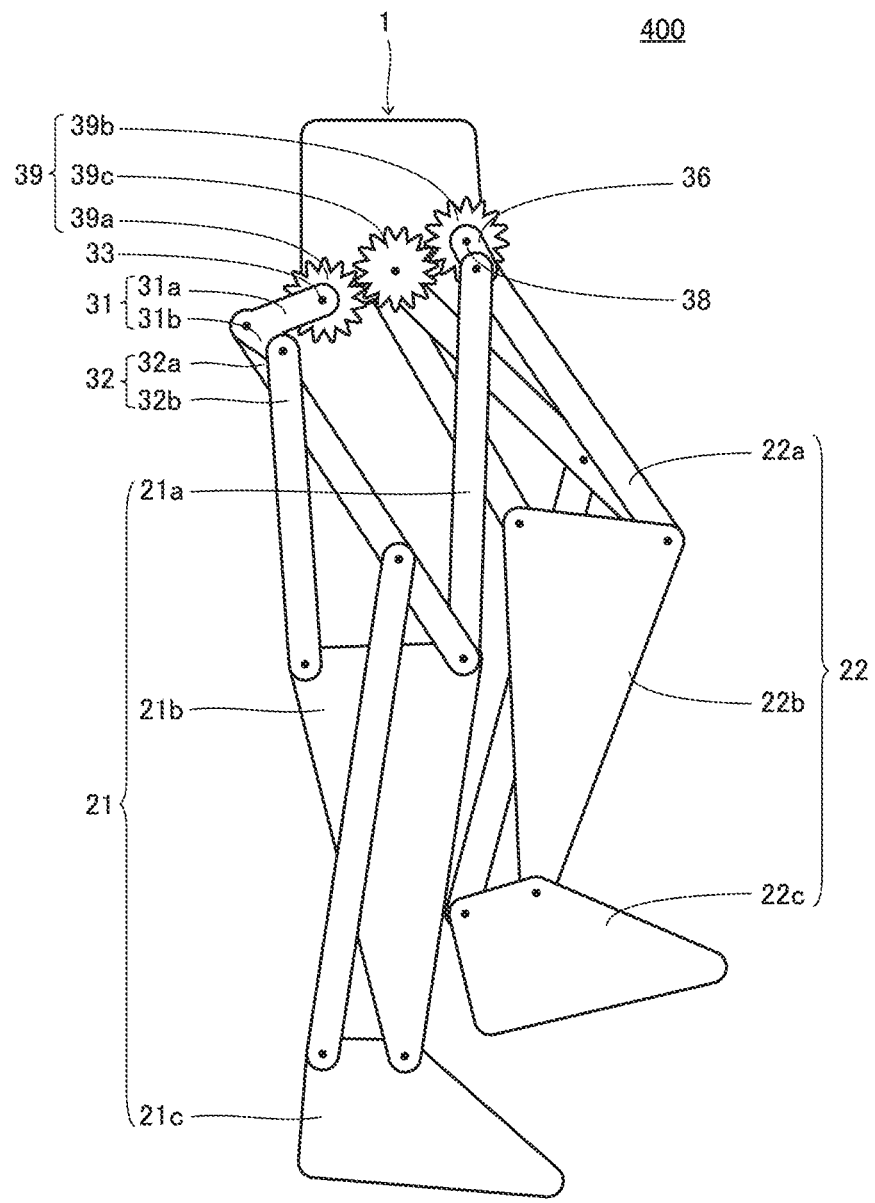
FIG. 12 is a side view of a passive walking apparatus according to a third embodiment.
Figure 13:
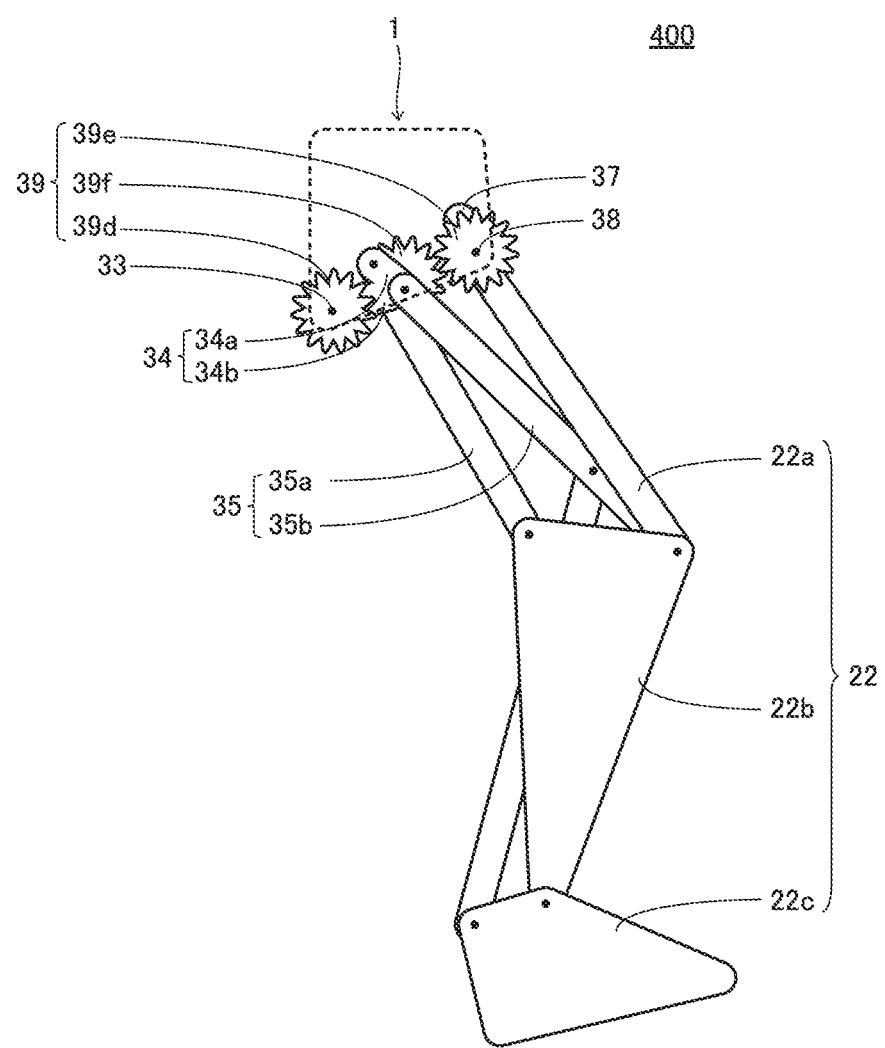
FIG. 13 is a side view of the passive walking apparatus according to the third embodiment showing only a construction on the side of the second leg.

A construction of a passive walking apparatus 400 according to a third embodiment will be described below. A difference from the first embodiment will mainly be described and redundant description will not be repeated. FIG. 12 is a side view of passive walking apparatus 400 according to the third embodiment. FIG. 13 is a side view of passive walking apparatus 400 according to the third embodiment showing only a construction on the side of second leg 22.

As shown in FIGS. 12 and 13, passive walking apparatus 400 according to the third embodiment includes hip portion 1 including first side portion 11 and second side portion 12, a leg portion 2 including first leg 21 coupled to first side portion 11 and second leg 22 coupled to second side portion 12, and crank mechanism 3. Crank mechanism 3 includes crank portion 31, connection portion 32, crankshaft 33, crank portion 34, connection portion 35, a third crank 36, a third crank 37, a crankshaft 38, and a synchronization mechanism 39.

First leg 21 includes thigh portion 21a, lower leg portion 21b, and foot portion 21c. Second leg 22 includes thigh portion 22a, lower leg portion 22b, and foot portion 22c. Third crank 36 and third crank 37 are coupled to each other with crankshaft 38 being interposed. Third crank 36 is located on the side of first side portion 11. Third crank 37 is located on the side of second side portion 12. Thigh portion 21a is coupled to third crank 36. Thigh portion 22a is connected to third crank 37. Third crank 36 is provided as being opposite in phase to third crank 37.

More specifically, thigh portion 21a is connected to third crank 36 such that a position of a point of connection to third crank 36 when first leg 21 is away from walking surface GR is farther from walking surface GR than a position of a point of connection to third crank 36 when first leg 21 is in contact with walking surface GR. Similarly, thigh portion 22a is connected to third crank 37 such that a position of a point of connection to third crank 37 when second leg 22 is away from walking surface GR is farther from walking surface GR than a position of a point of connection to third crank 37 when second leg 22 is in contact with walking surface GR.

In the present embodiment, synchronization mechanism 39 includes a gear 39a, a gear 39b, and a gear 39c arranged on the side of first side portion 11 and a gear 39d, a gear 39e, and a gear 39f arranged on the side of second side portion 12. Gear 39a and gear 39d are attached to crankshaft 33. Gear 39b and gear 39e are attached to crankshaft 38. Gear 39c is arranged between gear 39a and gear 39b and meshed with gear 39a and gear 39b. Gear 39f is arranged between gear 39d and gear 39e and meshed with gear 39d and gear 39e. Therefore, with rotation of crankshaft 33, third crank 36 and third crank 37 coupled to crankshaft 38 pivot in the same direction as crankshaft 33 in synchronization with crankshaft 33. A set of gear 39a and gear 39d, a set of gear 39b and gear 39e, and a set of gear 39c and gear 39f may each be implemented as a single gear.

The construction of synchronization mechanism 39 is not limited as such. For example, rotation of crankshaft 33 may be transmitted to third crank 36 and third crank 37 coupled to crankshaft 38 by coupling gear 39a (gear 39d) and gear 39b (gear 39e) to each other with a chain or a belt without providing gear 39c and gear 39f.

As set forth above, when second leg 22 moves rearward from the front relatively to hip portion 1, connection portion 35 has crank portion 34 and crankshaft 33 pivot and rotate with reaction force from the ground transmitted from second leg 22. As set forth above, crankshaft 38 rotates in synchronization with crankshaft 33 in the direction the same as crankshaft 33. Consequently, when first leg 21 moves forward from the rear relatively to hip portion 1, third crank 36 lifts first leg 21 away from walking surface GR. Thus, according to passive walking apparatus 400 according to the third embodiment, walking with the idling leg being lifted higher than in passive walking apparatus 100 according to the first embodiment can be achieved.

Fourth Embodiment

A construction of a passive walking apparatus 500 according to a fourth embodiment will be described below. A difference from the first embodiment will mainly be described and redundant description will not be repeated.

Figure 14:
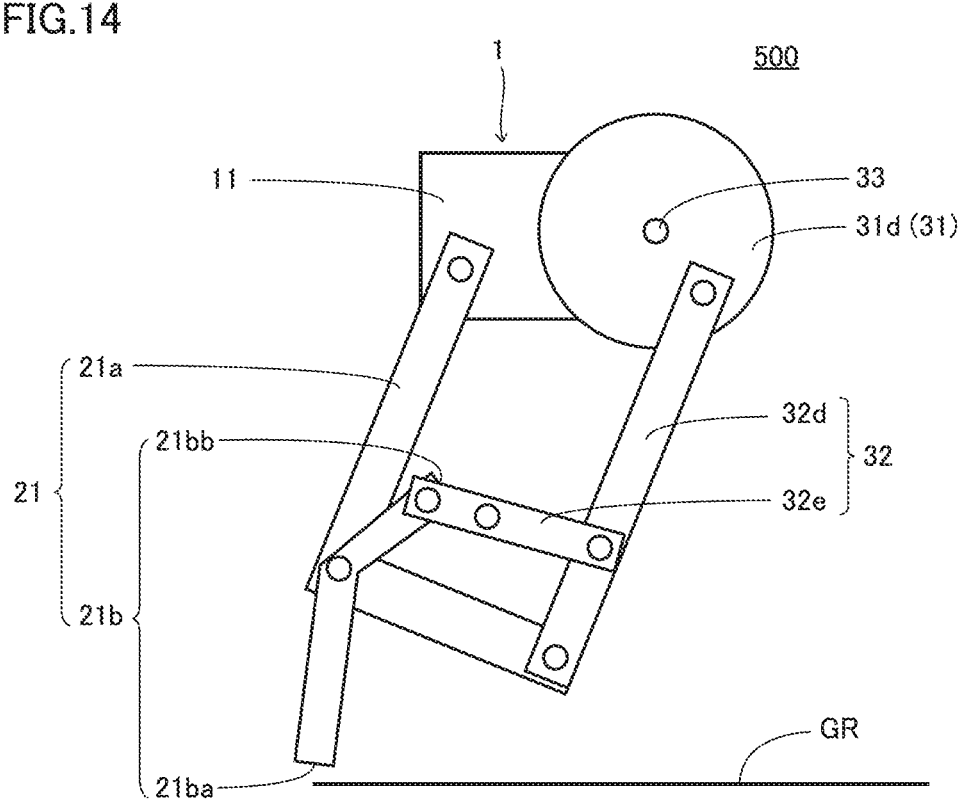
FIG. 14 is a side view of a passive walking apparatus according to a fourth embodiment showing only a construction on the side of the first leg.
Figure 15:
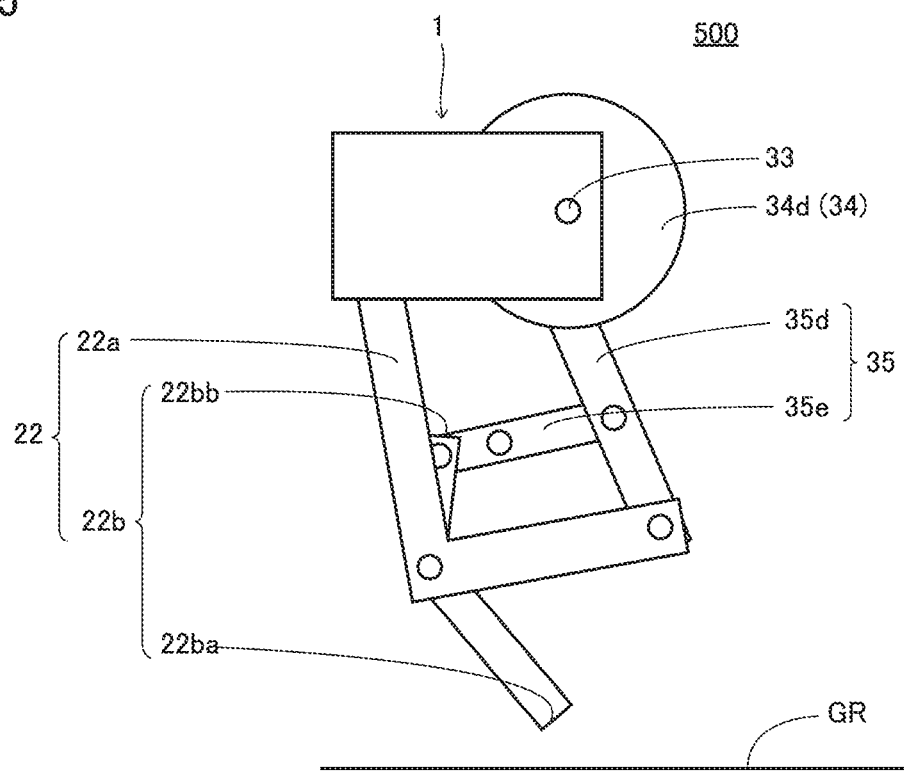
FIG. 15 is a side view of the passive walking apparatus according to the fourth embodiment showing only a construction on the side of the second leg.

FIG. 14 is a side view of passive walking apparatus 500 according to the fourth embodiment showing only a construction on the side of first leg 21. FIG. 15 is a side view of passive walking apparatus 500 according to the fourth embodiment showing only a construction on the side of second leg 22. As shown in FIGS. 14 and 15, passive walking apparatus 500 according to the fourth embodiment includes hip portion 1 including first side portion 11 and second side portion 12, leg portion 2 including first leg 21 coupled to first side portion 11 and second leg 22 coupled to second side portion 12, and crank mechanism 3. Crank mechanism 3 includes crank portion 31, connection portion 32, crankshaft 33, crank portion 34, and connection portion 35.

First leg 21 includes thigh portion 21a and lower leg portion 21b. Second leg 22 includes thigh portion 22a and lower leg portion 22b. Lower leg portion 21b includes a first end 21ba and a second end 21bb. First end 21ba is an end of lower leg portion 21b on a side of walking surface GR. Second end 21bb is an end opposite to first end 21ba. Lower leg portion 21b is pivotably coupled to thigh portion 21a at a point between first end 21ba and second end 21bb. Lower leg portion 21b is preferably bent toward a third connection member 32d at a point of coupling to thigh portion 21a.

Lower leg portion 22b includes a first end 22ba and a second end 22bb. First end 22ba is an end of lower leg portion 22b on the side of walking surface GR. Second end 22bb is an end opposite to first end 22ba. Lower leg portion 22b is pivotably coupled to thigh portion 22a at a point between first end 22ba and second end 22bb. Lower leg portion 22b is preferably bent toward a third connection portion 35d at a point of coupling to thigh portion 22a.

Crank portion 31 is implemented by a crank 31d. Connection portion 32 includes third connection member 32d and a fourth connection member 32e. Third connection member 32d is connected to crank 31d. Fourth connection member 32e has one end pivotably coupled to lower leg portion 21b on the side of second end 21bb. Fourth connection member 32e has the other end coupled to third connection member 32d.

Crank portion 34 is implemented by a crank 34d. Connection portion 35 includes third connection member 35d and a fourth connection member 35e. Third connection member 35d is connected to crank 34d. Fourth connection member 35e has one end pivotably coupled to lower leg portion 22b on the side of second end 22bb. Fourth connection member 35e has the other end coupled to third connection member 35d.

Figure 16:
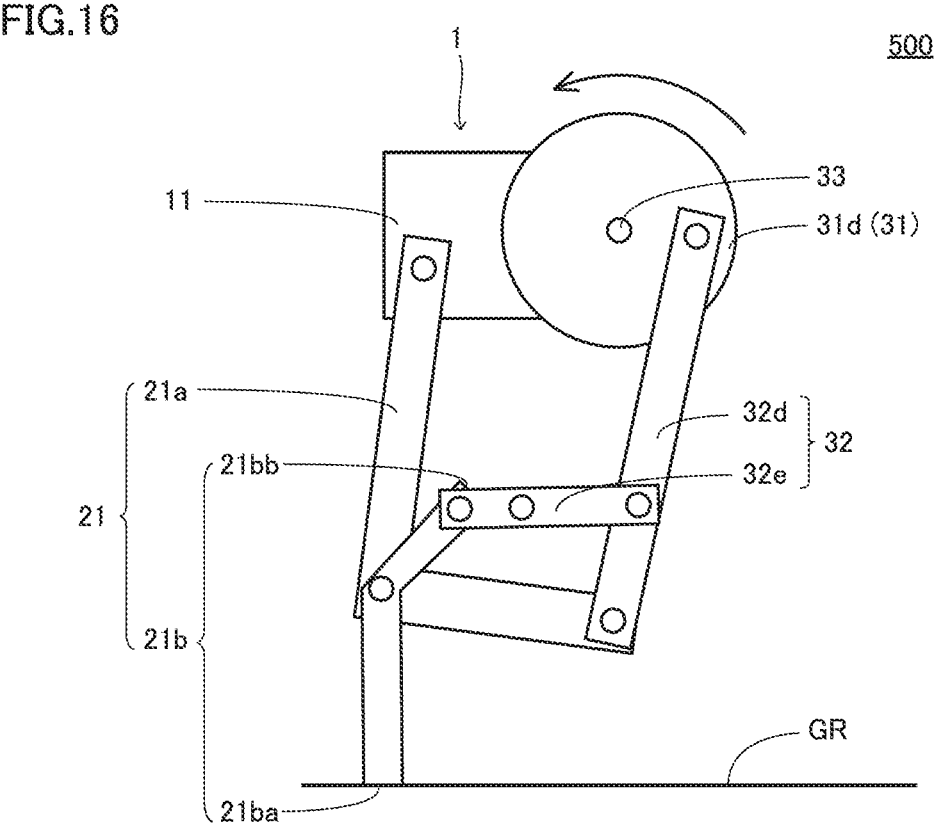
FIG. 16 is a side view showing only a construction on the side of the first leg of the passive walking apparatus according to the fourth embodiment when the first leg starts to come in contact with the walking surface.

FIG. 16 is a side view showing only a construction on the side of first leg 21 of passive walking apparatus 500 according to the fourth embodiment when first leg 21 starts to come in contact with walking surface GR. As shown in FIG. 16, first leg 21 moves rearward from the front relatively to hip portion 1. With this movement, the side of first end 21ba of lower leg portion 21b comes in contact with walking surface GR. With this contact, reaction force from the ground is transmitted to connection portion 32 (third connection member 32d and fourth connection member 32e), and has crank 31d rotate. Rotation of crank 31d is transmitted to connection portion 35 (third connection member 35d and fourth connection member 35e) with crankshaft 33 and crank 34d being interposed and moves second leg 22 forward from the rear relatively to hip portion 1.

Figure 17:
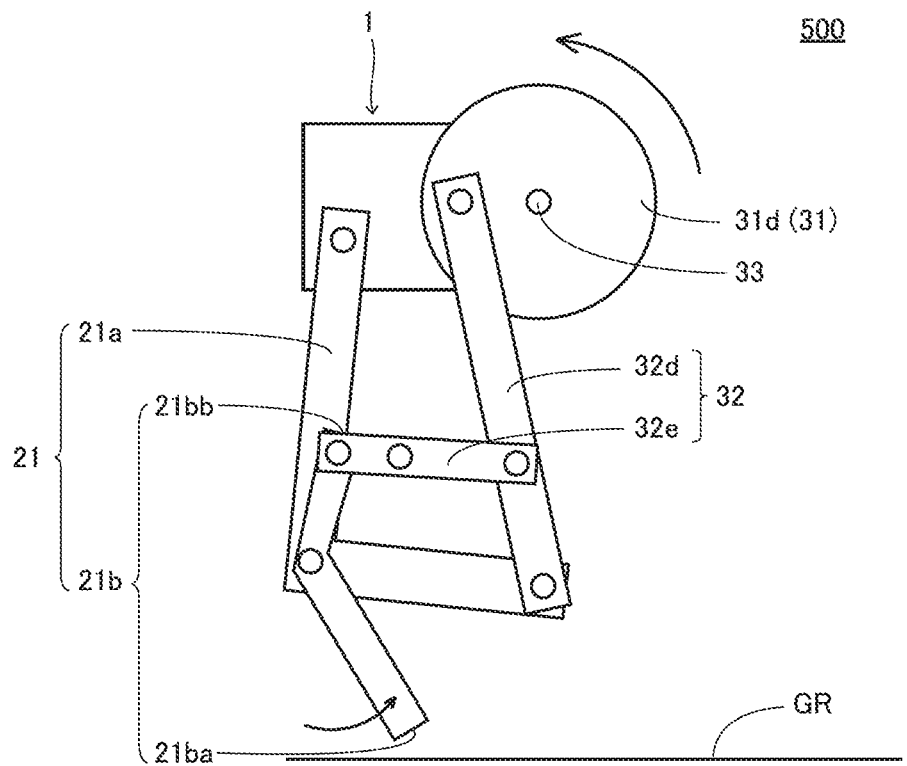
FIG. 17 is a side view showing only a construction on the side of the first leg of the passive walking apparatus according to the fourth embodiment when the first leg moves away from the walking surface.

FIG. 17 is a side view showing only a construction on the side of first leg 21 of passive walking apparatus 500 according to the fourth embodiment when first leg 21 moves away from walking surface GR. As shown in FIG. 17, with progress of rotation of crank 31d, a distance between a point of connection between crank 31d and third connection member 32d and a point of coupling between thigh portion 21a and hip portion 1 is smaller. Consequently, fourth connection member 32e has lower leg portion 21b pivot such that an angle formed between a direction from a point of coupling between thigh portion 21a and lower leg portion 21b toward first end 21ba and a direction of extension of thigh portion 21a is greater. With this pivot of lower leg portion 21b, first end 21ba moves away from walking surface GR.

Figure 18:
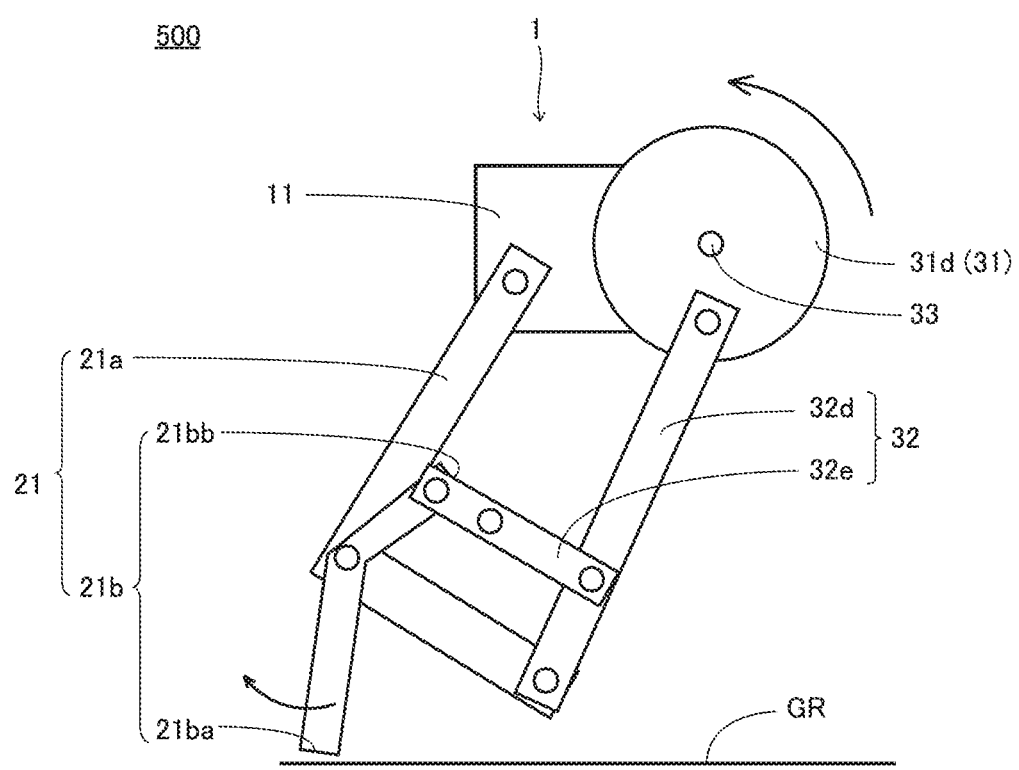
FIG. 18 is a side view showing only a construction on the side of the first leg of the passive walking apparatus according to the fourth embodiment when the first leg comes in contact with the walking surface.

FIG. 18 is a side view showing only a construction on the side of first leg 21 of passive walking apparatus 500 according to the fourth embodiment when first leg 21 comes in contact with walking surface GR. As shown in FIG. 18, with further progress of pivot of crank 31d, a distance between the point of connection between crank 31d and third connection member 32d and the point of coupling between thigh portion 21a and hip portion 1 is again greater. Consequently, fourth connection member 32e has lower leg portion 21b pivot such that an angle formed between the direction from the point of coupling between thigh portion 21a and lower leg portion 21b toward first end 21ba and the direction of extension of thigh portion 21a is smaller. With this pivot, first end 21ba comes in contact again with walking surface GR.

Thus, according to passive walking apparatus 500 according to the fourth embodiment, with rotation of crank 31d (crank 34d), an angle formed between a portion of lower leg portion 21b (lower leg portion 22b) on the side of first end 21ba (first end 22ba) and thigh portion 21a (thigh portion 22a) varies. Therefore, passive walking apparatus 500 according to the fourth embodiment can continue walking, with first end 21ba (first end 22ba) vertically moving with respect to walking surface GR.

Fifth Embodiment

Figure 19:
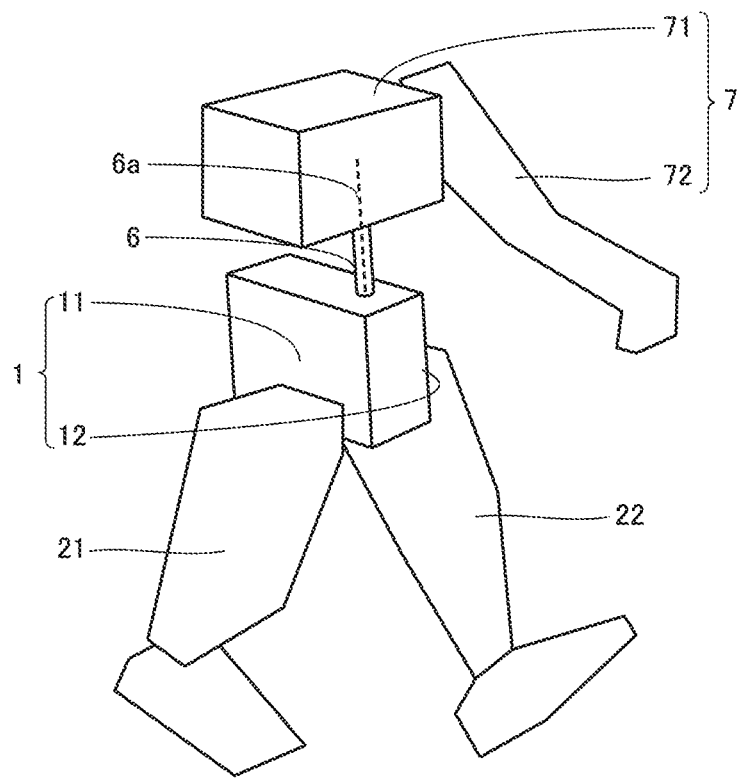
FIG. 19 is a perspective view of a passive walking apparatus according to a fifth embodiment.
Figure 20:
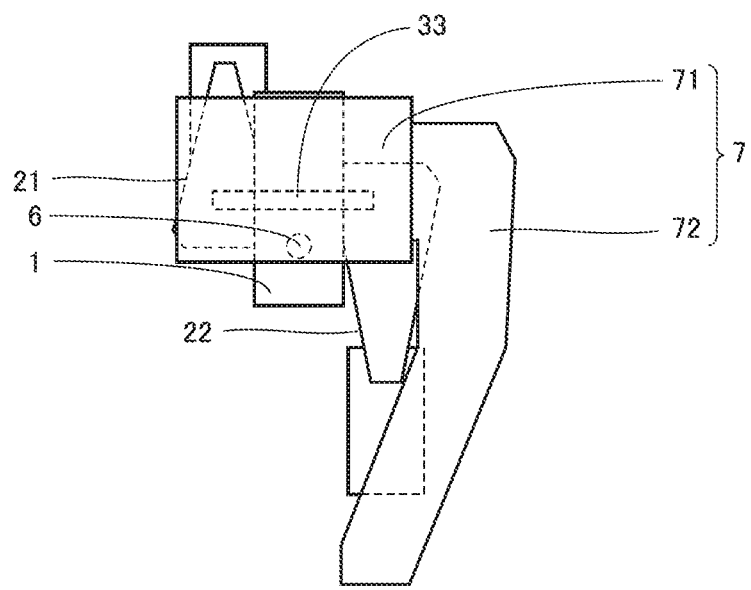
FIG. 20 is a plan view of the passive walking apparatus according to the fifth embodiment.

A construction of a passive walking apparatus 600 according to a fifth embodiment will be described below. A difference from the first embodiment will mainly be described and redundant description will not be repeated. FIG. 19 is a perspective view of passive walking apparatus 600 according to the fifth embodiment. FIG. 20 is a plan view of passive walking apparatus 600 according to the fifth embodiment.

As shown in FIGS. 19 and 20, passive walking apparatus 600 according to the fifth embodiment includes hip portion 1, first leg 21, second leg 22, a rotation shaft 6, and an upper body portion 7. Passive walking apparatus 600 according to the fifth embodiment preferably includes crank mechanism 3. Crank mechanism 3 is implemented, for example, by any of crank mechanisms 3 according to the first to fourth embodiments. Passive walking apparatus 600 according to the fifth embodiment does not have to include crank mechanism 3.

Rotation shaft 6 is attached to hip portion 1. More specifically, rotation shaft 6 is fixed to hip portion 1. Rotation shaft 6 is attached to hip portion 1 so as not to rotate around a central axis 6a with respect to hip portion 1. Rotation shaft 6 is preferably attached in front of crankshaft 33 in a plan view.

Upper body portion 7 is attached to rotation shaft 6. Upper body portion 7 is attached to rotation shaft 6 so as to be rotatable around central axis 6a. An angle up to which upper body portion 7 can rotate around central axis 6a with respect to rotation shaft 6 may be restricted. Upper body portion 7 includes a chest portion 71 and an arm portion 72. External force for passive walking apparatus 600 according to the fifth embodiment to continue walking is applied to upper body portion 7. This force may be applied by pulling arm portion 72 or pushing chest portion 71 forward from the rear. In another embodiment, rotation shaft 6 may be fixed to upper body portion 7 and rotatably attached to hip portion 1, or an angle up to which the rotation shaft can rotate with the rotation shaft being rotatably attached to both of upper body portion 7 and hip portion 1 may be restricted.

Figure 21:
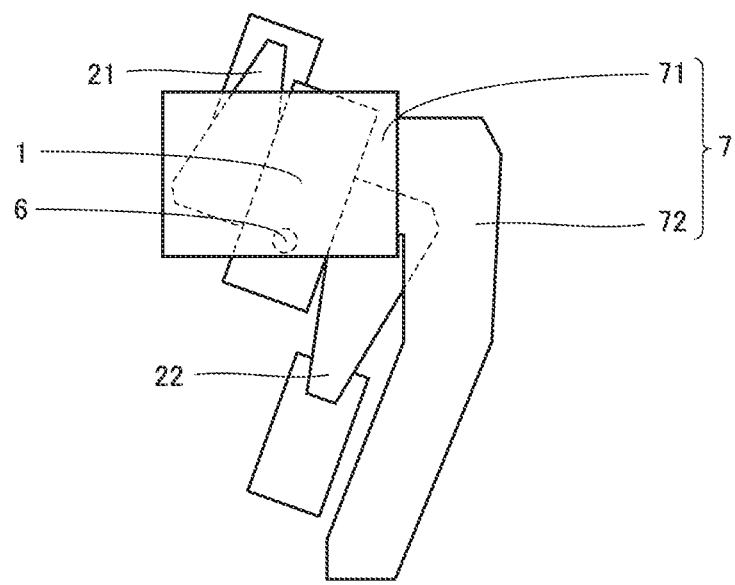
FIG. 21 is a plan view of the passive walking apparatus according to the fifth embodiment when the first leg is located in front during walking.
Figure 22:
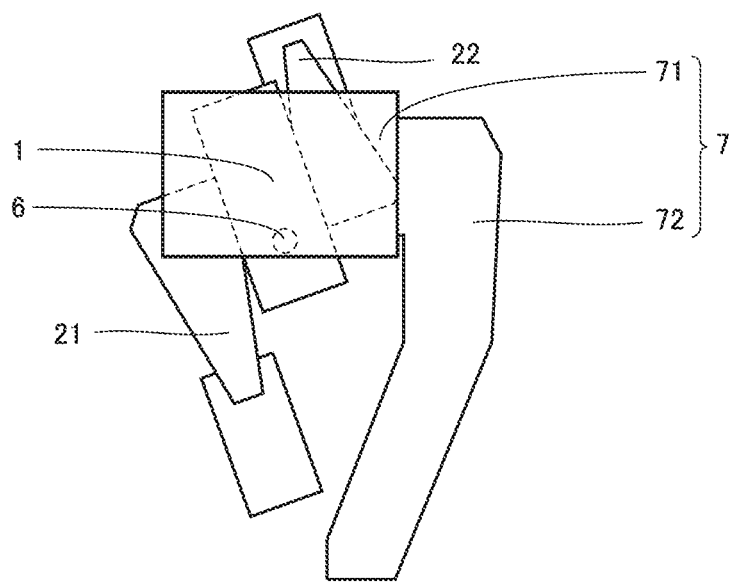
FIG. 22 is a plan view of the passive walking apparatus according to the fifth embodiment when the second leg is located in front during walking.

FIG. 21 is a plan view of passive walking apparatus 600 according to the fifth embodiment when second leg 22 is located in front and first leg 21 is located in the rear during walking by pulling. FIG. 22 is a plan view of passive walking apparatus 600 according to the fifth embodiment when first leg 21 is located in front and second leg 22 is located in the rear during walking by pulling. As set forth above, rotation shaft 6 is fixed to hip portion 1, whereas it is rotatable around central axis 6a with respect to upper body portion 7. Therefore, when force for continuing walking is applied to upper body portion 7 by pulling arm portion 72, rotation shaft 6, hip portion 1, first leg 21, and second leg 22 rotate around central axis 6a. Consequently, as shown in FIGS. 21 and 22, of first leg 21 and second leg 22, a leg located in front can come in contact with walking surface GR at a position closer to the center of gravity. Therefore, passive walking apparatus 600 according to the fifth embodiment can suppress lateral sway involved with a continued walking action.

Sixth Embodiment

A construction of a passive walking apparatus 300 (a passive walking module) according to a sixth embodiment will be described below. A difference from the first embodiment will mainly be described and redundant description will not be repeated.

Figure 23:
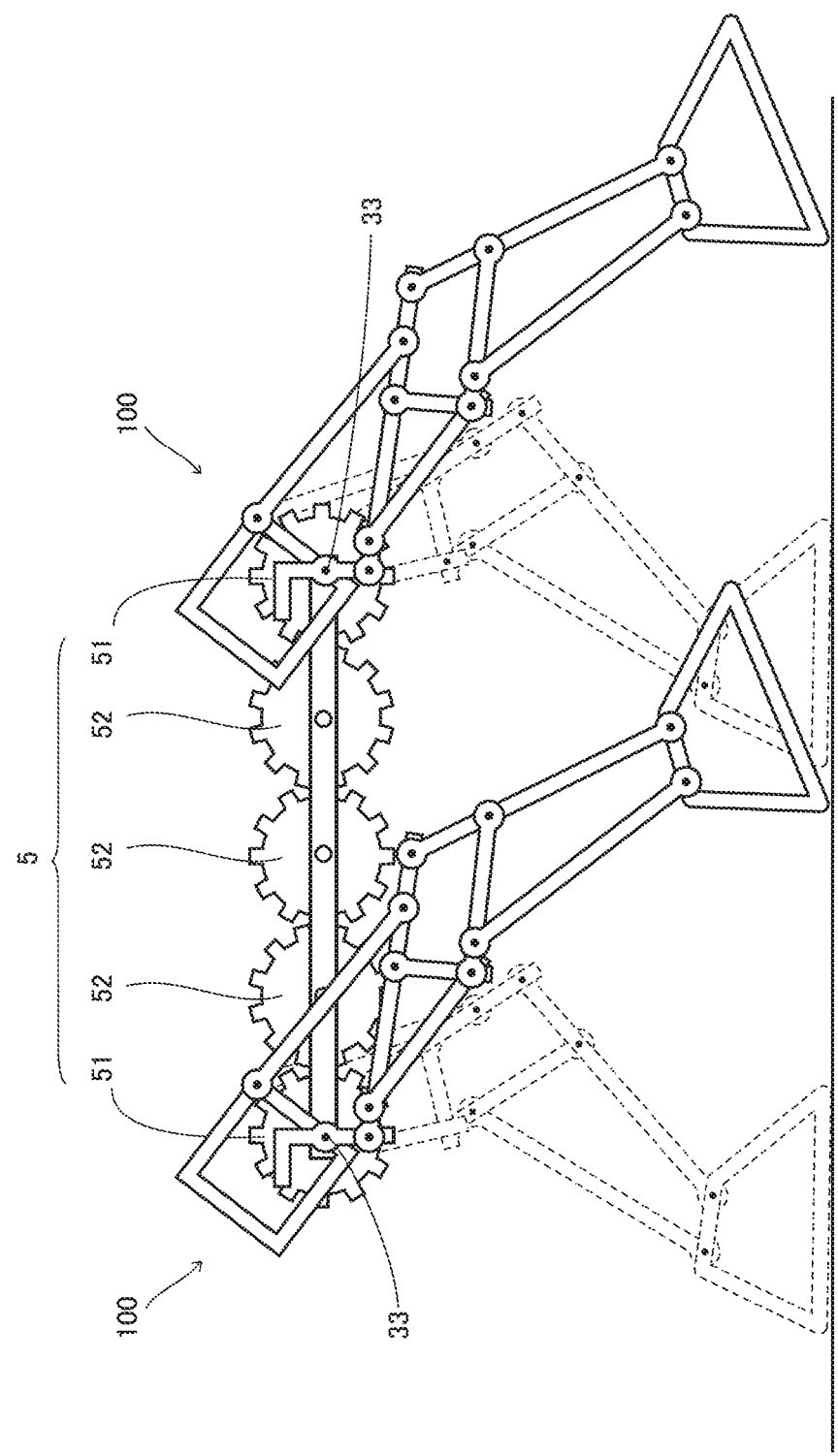
FIG. 23 is a side view of a passive walking apparatus according to a sixth embodiment.

FIG. 23 is a side view of passive walking apparatus 300 according to the sixth embodiment. As shown in FIG. 23, passive walking apparatus 300 according to the sixth embodiment is constructed such that a plurality of passive walking apparatuses 100 according to the first embodiment are coupled in a direction of movement.

More specifically, passive walking apparatus 300 according to the sixth embodiment includes a plurality of (for example, two) passive walking apparatuses 100 according to the first embodiment and a coupling mechanism 5. Coupling mechanism 5 includes a gear 51 and a gear 52. Gear 51 is provided on crankshaft 33. Gear 52 is provided such that a plurality of gears 51 rotate in synchronization. For example, gears 51 are synchronized by interposing an odd number of (three in FIG. 23) gears 52 between the plurality of gears 51. Gear 52 transmits motive power of gear 51 of one passive walking apparatus 100 according to the first embodiment to gear 51 of the other passive walking apparatus 100 according to the first embodiment through gear 52. Thus, coupling mechanism 5 tunes passive walking of the plurality of passive walking apparatuses 100 according to the first embodiment to each other.

Though an example in which a plurality of passive walking apparatuses 100 according to the first embodiment are coupled with coupling mechanism 5 is described above, coupling mechanism 5 may couple a plurality of passive walking apparatuses 200 according to the second embodiment, a plurality of passive walking apparatuses 400 according to the third embodiment, or a plurality of passive walking apparatuses 500 according to the fourth embodiment.

An effect of passive walking apparatus 300 according to the sixth embodiment will be described below. With passive walking apparatus 300 according to the sixth embodiment, a multi-legged passive walking apparatus such as a four-legged passive walking apparatus can also continue stable passive walking.

It should be understood that the embodiments disclosed herein are illustrative and non-restrictive in every respect. The scope of the present invention is defined by the terms of the claims rather than the embodiments above and is intended to include any modifications within the scope and meaning equivalent to the terms of the claims.

REFERENCE SIGNS LIST 1 hip portion; 11 first side portion; 12 second side portion; 13, 14 protruding portion; 2 leg portion; 21 first leg; 21a thigh portion; 21b lower leg portion; 21c foot portion; 21d calf portion; 22 second leg; 22a thigh portion; 22b lower leg portion; 22c foot portion; 22d calf portion; 3 crank mechanism; 31 crank portion; 31a first crank; 31b second crank; 31c crank; 31d crank; 32 connection portion; 32a first connection member; 32b second connection member; 32c connection member; 32ca first portion; 32cb second portion; 32d third connection member; 32e fourth connection member; 33 crankshaft; 34 crank portion; 34a first crank; 34b second crank; 34c crank; 34d crank; 35 connection portion; 35a first connection member; 35b second connection member; 35c connection member; 35ca first portion; 35cb second portion; 35d third connection member; 35e fourth connection member; 36 third crank; 37 third crank; 38 crankshaft; 39 synchronization mechanism; 39a, 39b, 39c, 39d, 39e, 39f gear; 4 pivot assistance portion; 41 groove; 42 elastic member; 5 coupling mechanism; 51, 52 gear; and 100, 110, 120, 200, 300, 400, 500, 600 passive walking apparatus

The invention claimed is:

1. A passive walking apparatus comprising:
a hip portion including a first side portion and a second side portion located opposite to the first side portion;
a first leg coupled to the first side portion;
a second leg coupled to the second side portion; and
a crank mechanism including a first-leg-side crank portion provided on a side of the first side portion, a second-leg-side crank portion provided on a side of the second side portion as being opposite in phase to the first-leg-side crank portion, a crankshaft coupling the first-leg-side crank portion and the second-leg-side crank portion to each other, a first-leg-side connection portion connected to the first leg and the first-leg-side crank portion, and a second-leg-side connection portion connected to the second-leg-side crank portion and the second leg,
wherein the first-leg-side connection portion is configured to pivot the first-leg-side crank portion, the first-leg-side crank portion is configured to pivot the second-leg-side crank portion around the crankshaft, and the second-leg-side connection portion is interposed between the second-leg-side crank portion and the second leg such that the second-leg-side crank portion moves the second leg forward relative to the hip portion when the first leg moves rearward relative to the hip portion in contact with a walking surface.

2. The passive walking apparatus according to claim 1, wherein:
the first-leg-side crank portion includes a first crank having a first crank dead point and a second crank having a second crank dead point, a position of the first crank dead point not being superimposed on a position of the second crank dead point, and
the first-leg-side connection portion is configured to pivot at least one of the first crank and the second crank while the first leg moves rearward relative to the hip portion.

3. The passive walking apparatus according to claim 2, wherein:
the first leg includes a thigh member and a lower leg member,
the first-leg-side connection portion includes a first connection member and a second connection member,
the first connection member is coupled to the thigh member and the first crank, and
the second connection member is coupled to the lower leg member and the second crank.

4. The passive walking apparatus according to claim 3, wherein:
a straight line connecting a point of contact between the first leg and the walking surface to a point of connection of the first crank to the first connection member substantially matches with a tangent line of pivot of the first crank when the first leg starts to contact the walking surface, and
a straight line connecting the point of contact between the first leg and the walking surface to a point of connection of the second crank to the second connection member substantially matches with a tangent line of pivot of the second crank when the first leg passes under the hip portion.

5. The passive walking apparatus according to claim 1, the passive walking apparatus further comprising a pivot assistance portion coupled to the crank mechanism, the pivot assistance portion including an elastic member, wherein
the elastic member is configured to bias the second-leg-side crank portion and the elastic member is configured to contract when the second leg moves away from the walking surface and extend when the second leg moves forward relative to the hip portion to pivot the second-leg-side crank portion.

6. The passive walking apparatus according to claim 1, wherein:
the crank mechanism further includes a third crank provided on a side of the hip portion of the first side portion,
the first leg is connected to the third crank,
the third crank is configured to pivot in synchronization with the crankshaft in an identical direction, and
the third crank is configured to pivot in a direction in which a point of connection to the first leg moves away from the walking surface when the second leg moves forward relative to the hip portion.

7. The passive walking apparatus according to claim 1, wherein:
the first leg includes a thigh member and a lower leg member,
the lower leg member includes a first end and a second end opposite to the first end and the lower leg member being coupled to the thigh member between the first end and the second end such that the lower leg member is pivotable with respect to the thigh member,
the first-leg-side connection portion includes a third connection member and a fourth connection member,
the third connection member is connected to the first-leg-side crank portion,
the fourth connection member a first end pivotably coupled to the third connection member and a second end pivotably coupled to a side of the second end of the lower leg member, and
an angle formed between a direction of extension of the thigh member and a direction from a point of coupling between the thigh member and the lower leg member toward the first end is variable in accordance with a distance between a point of connection between the third connection member and the first-leg-side crank portion and a point of coupling between the thigh member and the hip portion.

8. The passive walking apparatus according to claim 1 further comprising:
a rotation shaft fixed to the hip portion; and
an upper body portion rotatably attached around a central axis of the rotation shaft.

9. A passive walking module comprising:
a plurality of the passive walking apparatuses according to claim 1; and
a coupling mechanism configured to tune passive walking of the passive walking apparatuses to one another.

10. The passive walking apparatus according to claim 3, wherein
each of the first leg and the second leg includes a lower leg member,
each of the first-leg-side connection portion and the second-leg-side connection portion includes a first connection member,
the first connection member of the first-leg-side connection portion has a first end coupled to the lower leg member of the first leg,
the first connection member of the second-leg-side connection portion has a second end coupled to the lower leg member of the second leg, and
the second end is spaced farther from the walking surface than the first end when the first leg is in contact with the walking surface and the second leg is not in contact with the walking surface.

11. The passive walking apparatus according to claim 10, wherein
each of the first leg and the second leg includes a thigh member,
a knee of the first leg is formed where the thigh member and the lower leg member of the first leg are coupled, and
a knee of the second leg is formed where the thigh member and the lower leg member of the second leg are coupled.

12. The passive walking apparatus according to claim 10, wherein each of the first leg and the second leg includes a thigh member, and
the thigh member and the hip portion are coupled at a location that is forward of the crankshaft in a walking direction of the passive walking apparatus.

13. The passive walking apparatus according to claim 10, wherein
each of the first leg and the second leg includes a thigh member, and
the thigh member of the first leg and the hip portion are coupled at a location that is forward of a location at which the first connection member of the first-leg-side connection portion and the first-leg-side crank portion are coupled in a walking direction of the passive walking apparatus, and the thigh member of the second leg and the hip portion are coupled at a location that is forward of a location at which the second connection member of the second-leg-side connection portion and the second-leg-side crank portion are coupled in the walking direction of the passive walking apparatus.

14. The passive walking apparatus according to claim 3, wherein
each of the first leg and the second leg includes a thigh member and a lower leg member,
the thigh member of each of the first leg and the second leg is coupled to an upper portion of the lower leg member of a corresponding one of the first leg and the second leg,
each of the first-leg-side connection portion and the second-leg-side connection portion includes a first connection member,
the first connection member of the first-leg-side connection portion is connected to an upper portion of the lower leg member of the first leg, and
the second connection member of the second-leg-side connection portion is connected to an upper portion of the lower leg member of the second leg.

15. The passive walking apparatus according to claim 14, wherein
a knee of the first leg is formed where the thigh member and the lower leg member of the first leg are coupled, and
a knee of the second leg is formed where the thigh member and the lower leg member of the second leg are coupled.

16. The passive walking apparatus according to claim 14, wherein the thigh member and the hip portion are coupled at a location that is forward of the crankshaft in a walking direction of the passive walking apparatus.

17. A passive walking apparatus, comprising:
a hip;
a crankshaft;
a crank having a right crank and a left crank coupled to the crankshaft, the crank configured to rotate such that the left crank is opposite in phase to the right crank with respect to the crankshaft;
a right leg having a right upper leg, a right lower leg, and a right connection portion; and
a left leg having a left upper leg, a left lower leg, and a left connection portion,
wherein
the passive walking apparatus is configured to walk by the right leg and the left leg moving forward alternatively in accordance with a rotation of the crank,
the right upper leg is coupled to the hip,
the right connection portion is coupled to the right crank and the right lower leg, the left upper leg is coupled to the hip, the left connection portion is coupled to the left crank and the left lower leg, and the right upper leg and the hip are coupled at a right coupling location and the left upper leg and the hip are coupled at a left coupling location, the right coupling location and the left coupling location being positioned forward of the crankshaft in a walking direction of the passive walking apparatus.

18. The passive walking apparatus according to claim 17, wherein a knee of the right leg is formed where the right upper leg and the right lower leg are coupled, and a knee of the left leg is formed where the left upper leg and the left lower leg are coupled.

19. The passive walking apparatus according to claim 17, wherein the right coupling location is forward of a location at which the right connection portion and the right crank are coupled in the walking direction of the passive walking apparatus, and the left coupling location is forward of a location at which the left connection portion and the left crank are coupled in the walking direction of the passive walking apparatus.

* * * * *